US010159955B2

(12) United States Patent
Hruska

(10) Patent No.: US 10,159,955 B2
(45) Date of Patent: Dec. 25, 2018

(54) MULTI-MODE REACTOR FOR NON-THERMAL PLASMA ION DIRECT INJECTION

(71) Applicant: Pear Labs, LLC, Blue Springs, MO (US)

(72) Inventor: Christopher D. Hruska, Blue Springs, MO (US)

(73) Assignee: Pear Labs, LLC, Blue Springs, MO (US)

(*) Notice: Subject to any disclaimer, the term of this patent is extended or adjusted under 35 U.S.C. 154(b) by 28 days.

(21) Appl. No.: 15/392,617

(22) Filed: Dec. 28, 2016

(65) Prior Publication Data

US 2017/0189887 A1 Jul. 6, 2017

Related U.S. Application Data

(60) Provisional application No. 62/273,136, filed on Dec. 30, 2015.

(51) Int. Cl.
*B01J 19/08* (2006.01)
*H05H 1/24* (2006.01)

(52) U.S. Cl.
CPC .......... *B01J 19/088* (2013.01); *H05H 1/2406* (2013.01); *B01J 2219/0809* (2013.01); *B01J 2219/0826* (2013.01); *B01J 2219/0832* (2013.01); *B01J 2219/0869* (2013.01); *B01J 2219/0883* (2013.01); *B01J 2219/0884* (2013.01); *B01J 2219/0894* (2013.01); *B01J 2219/0896* (2013.01); *H05H 2001/2456* (2013.01)

(58) Field of Classification Search
None
See application file for complete search history.

(56) References Cited

U.S. PATENT DOCUMENTS

| 2009/0159211 | A1 | 6/2009 | Usui et al. |
| 2010/0310434 | A1 | 12/2010 | Buchanan et al. |
| 2014/0246364 | A1 | 9/2014 | Hruska et al. |
| 2016/0141151 | A1 | 5/2016 | Tamura |
| 2017/0095788 | A1 | 6/2017 | Buchanan |

OTHER PUBLICATIONS

International Search Report and Written Opinion for International Patent Appln. No. PCT/US17/55241; Filed Oct. 5, 2017 for Multi-Mode Reactor for Non-Thermal Plasma Ion Direct Injection.

*Primary Examiner* — Kishor Mayekar
(74) *Attorney, Agent, or Firm* — Hovey Williams LLP

(57) ABSTRACT

A plasma reactor comprises a housing, a first fluid inlet, a second fluid inlet, a first electric field generator, and an effluent outlet. The housing includes an axial aligned passageway and an internal reactor chamber coupled with the passageway. The first fluid inlet receives and delivers a first fluid to the reactor chamber. The second fluid inlet receives and delivers a second fluid to the reactor chamber. The first electric field generator is positioned in the reactor chamber and includes a first electrode and a spaced apart second electrode. The first electric field generator generates a first electric field, wherein the first fluid passes through the first electric field creating a plasma which is injected into the second fluid while the second fluid is flowing through the passageway to create an effluent. The effluent outlet receives the effluent from the reactor chamber and delivers it to a destination.

20 Claims, 16 Drawing Sheets

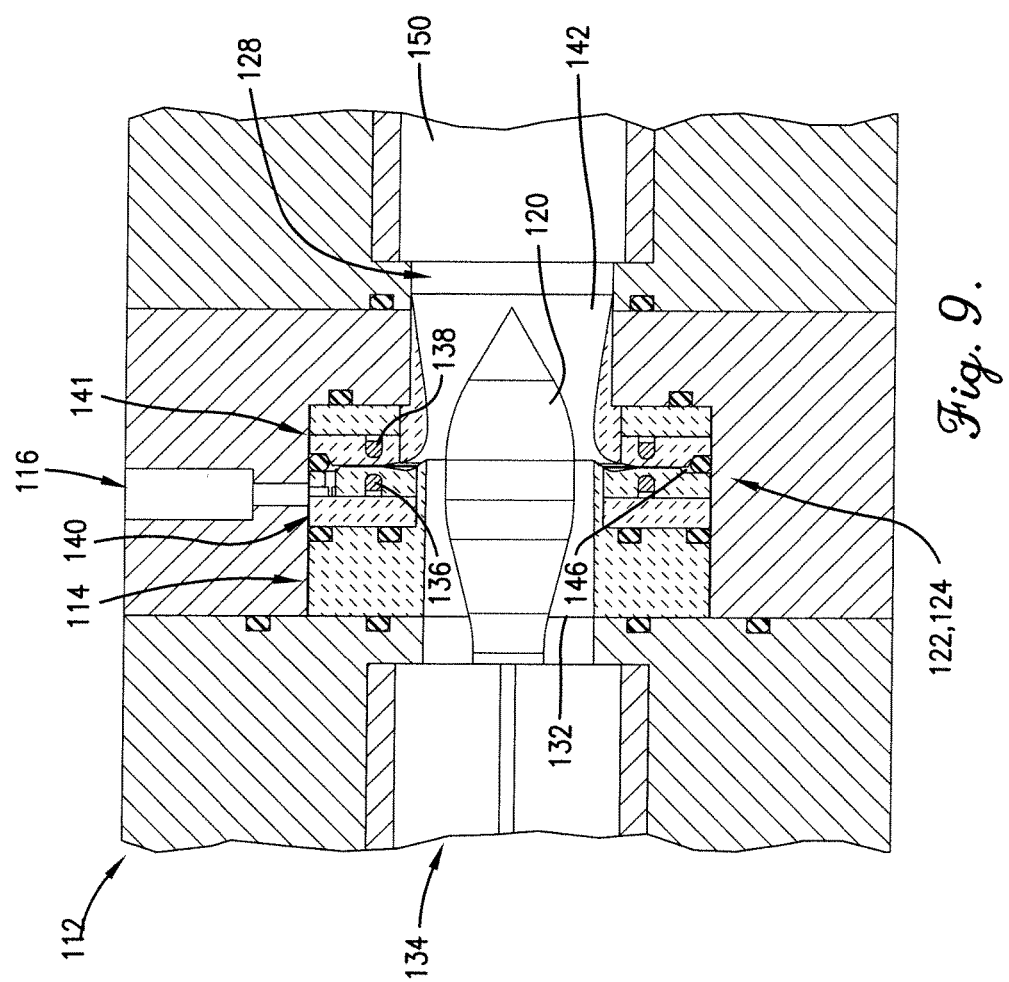

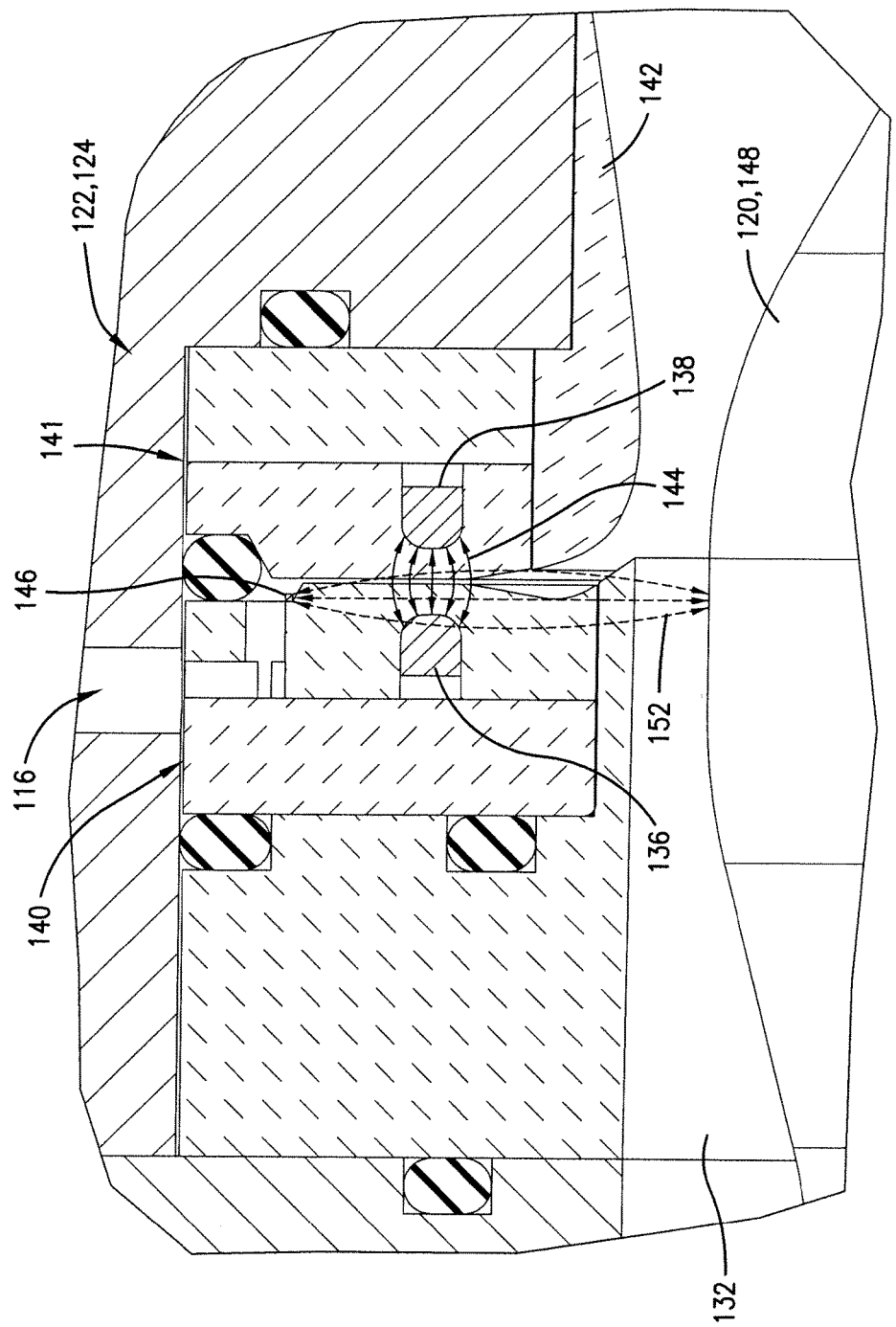

MULTI-MODE REACTOR FOR NON-THERMAL PLASMA ION DIRECT INJECTION

RELATED APPLICATION

The current patent application is a non-provisional application which claims priority benefit, with regard to all common subject matter, to U.S. Provisional Application No. 62/273,136, entitled "MULTI-MODE REACTOR FOR NON-THERMAL PLASMA ION DIRECT INJECTION", and filed Dec. 30, 2015. The earlier-filed provisional application is hereby incorporated by reference in its entirety into the current application.

BACKGROUND OF THE INVENTION

Field of the Invention

Embodiments of the current invention relate to reactors which create a plasma of a first fluid that is injected into a second fluid.

Description of the Related Art

Plasma reactors typically receive at least two fluids. In some situations, a first fluid may be a gas and a second fluid may be a liquid. In other situations, each fluid may be a gas. The plasma reactor may include at least one electric field generator that generates an electric field through which one or both of the fluids pass. Exposure to the electric field creates a plasma of at least one of the fluids which is injected into the other fluid to create an effluent. The plasma reactor may be utilized to provide treatment of the second fluid, such as breakdown of complex constituents within the second fluid, or create a product which is the combination of the first and second fluids. Example uses of the plasma reactor may include in-line liquid hydrocarbon fuel reforming for hydrogen enrichment to improve the fuel economy of internal combustion engines; nitrogen fixing by direct nitrogen ion injection into water; destruction of high molecular weight hydrocarbons (proteins and pharmaceuticals) in drinking water; ammonia/nitrate sequestering for treatment of high nitrate content water; demineralization (water softening) for consumer and industrial markets; and so forth.

SUMMARY OF THE INVENTION

An embodiment of the current invention provides a plasma reactor broadly comprising a housing, a first fluid inlet, a second fluid inlet, a first electric field generator, and an effluent outlet. The housing includes an axial aligned passageway extending from one end surface to an opposing end surface and an internal reactor chamber coupled with the passageway. The first fluid inlet receives a first fluid and deliver the first fluid to the reactor chamber. The second fluid inlet is aligned with the passageway. The second fluid inlet may receive a second fluid and deliver the second fluid to the reactor chamber. The first electric field generator is positioned in the reactor chamber and includes a first electrode and a spaced apart second electrode. The first electric field generator may generate a first electric field of roughly hollow cylindrical shape, wherein the first fluid passes through the first electric field creating a plasma which is injected into the second fluid while the second fluid is flowing through the passageway to create an effluent. The effluent outlet is aligned with the passageway. The effluent outlet may receive the effluent from the reactor chamber and deliver it to a destination.

Another embodiment of the current invention provides a plasma reactor broadly comprising a housing, a first fluid inlet, a second fluid inlet, a first electric field generator, and an effluent outlet. The housing includes an axial aligned passageway extending from one end surface to an opposing end surface and an internal reactor chamber coupled with the passageway. The first fluid inlet receives a first fluid and deliver the first fluid to the reactor chamber. The second fluid inlet is aligned with the passageway. The second fluid inlet may receive a second fluid and deliver the second fluid to the reactor chamber. The first electric field generator is positioned in the reactor chamber and includes a first electrode and a spaced apart second electrode, with each electrode being at least partially embedded in a dielectric shell. The first electric field generator may generate a first electric field of roughly hollow cylindrical shape, wherein the first fluid flows through the first electric field roughly in line with the first electric field creating a plasma which is injected into the second fluid to create an effluent. The effluent outlet may receive the effluent from the reactor chamber and deliver it to a destination.

Yet another embodiment of the current invention provides a plasma reactor broadly comprising a housing, a first fluid inlet, a second fluid inlet, a first electric field generator, and an effluent outlet. The housing includes an axial aligned passageway extending from one end surface to an opposing end surface and an internal reactor chamber coupled with the passageway. The first fluid inlet receives a first fluid and deliver the first fluid to the reactor chamber. The second fluid inlet is aligned with the passageway. The second fluid inlet may receive a second fluid and deliver the second fluid to the reactor chamber. The first electric field generator is positioned in the reactor chamber and includes a first electrode embedded in a first dielectric shell and a second electrode embedded in a second dielectric shell spaced apart from the first dielectric shell to create a gap therebetween. The first electric field generator may generate a first electric field of roughly hollow cylindrical shape, wherein the first fluid flows through the gap and roughly transversely through the first electric field creating a plasma which is injected into the second fluid while the second fluid is flowing through the passageway to create an effluent. The effluent outlet may receive the effluent from the reactor chamber and deliver it to a destination.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 9 is a partial sectional view of the plasma reactor cut along the line 9-9 from FIG. 7, illustrating the reactor chamber and the first and second electric field generators in more detail;

FIG. 10 is an enlargement of a portion of the sectional view of FIG. 9 showing a first fluid path and the first and second electric field generators in more detail;

Figure 1:
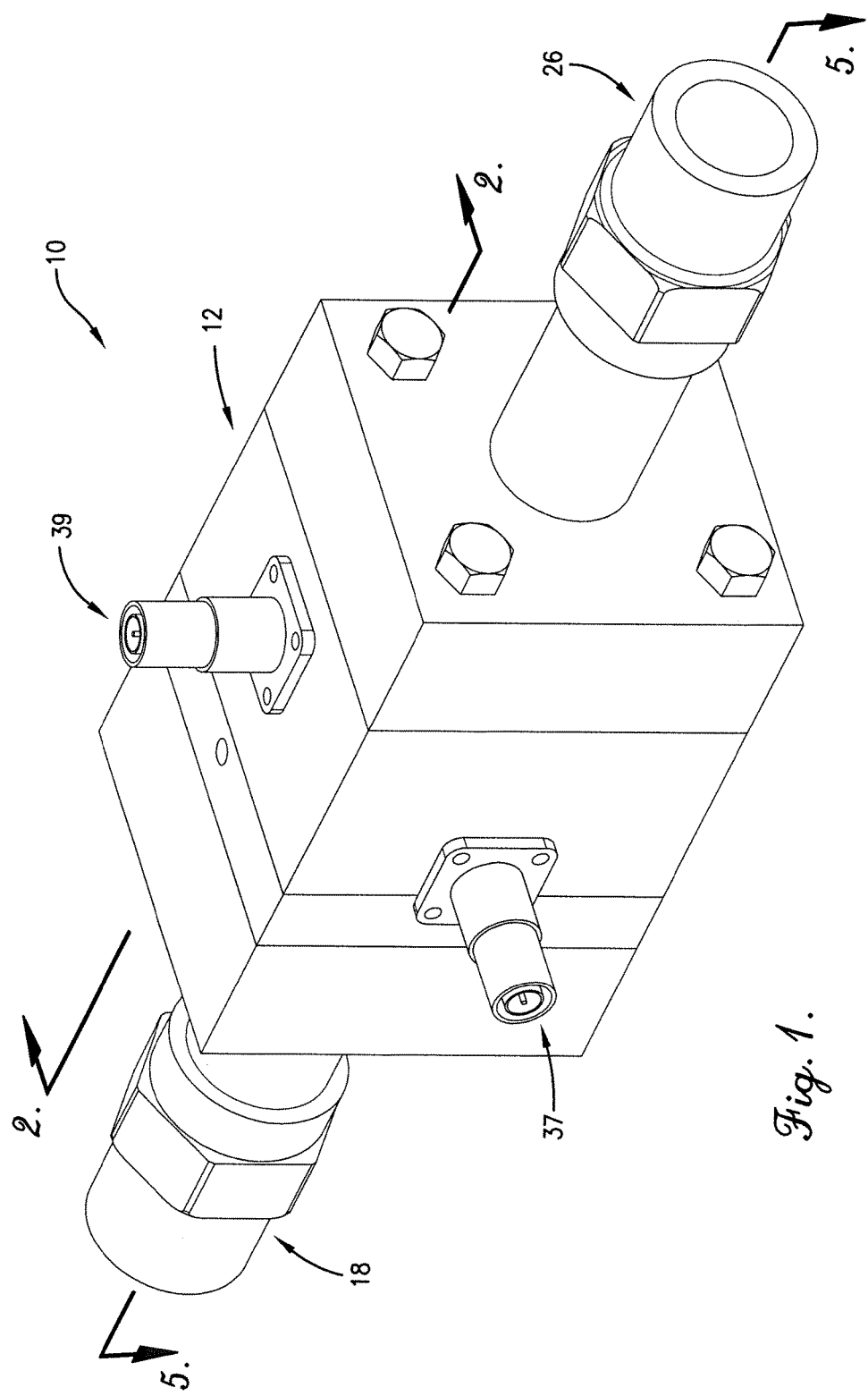
FIG. 1 is a perspective view of a plasma reactor, constructed in accordance with an embodiment of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A plasma reactor 10, constructed in accordance with at least a first embodiment of the current invention, is shown in FIGS. 1-6. The plasma reactor 10 may broadly comprise a housing 12, a reactor chamber 14, a first fluid inlet 16, a second fluid inlet 18, a venturi insert 20, a first electric field generator 22, a second electric field generator 24, and an effluent outlet 26. The plasma reactor 10 may also comprise a plurality of gaskets or seals, such as O-ring seals, that are positioned at the interfaces between various components of the reactor 10. The plasma reactor 10 may receive a first fluid and a second fluid as inputs. The first fluid may be ionized to form a plasma which is injected with the second fluid to create an effluent. The terms "upstream" and "downstream" may be used hereinafter to describe relative positionings or directions with regard to the flow of the first fluid, the second fluid, and/or the effluent.

Figure 2:
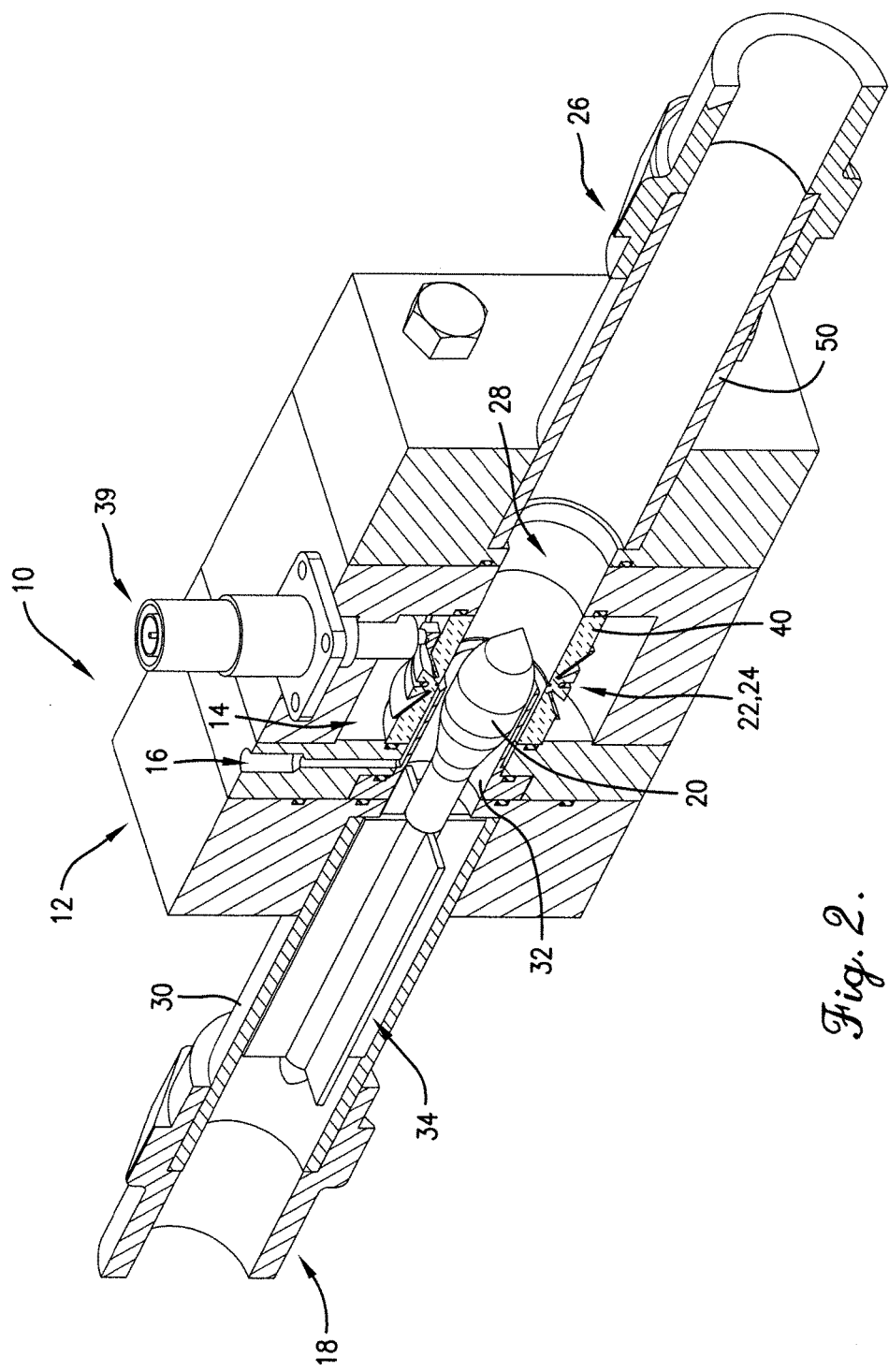
FIG. 2 is a sectional view of the plasma reactor cut along the line 2-2 from FIG. 1, illustrating a housing, a reactor chamber, a first fluid inlet, a second fluid inlet, a venturi insert, a first electric field generator with a first electrode, a second electric field generator, and an effluent outlet.
Figure 3:
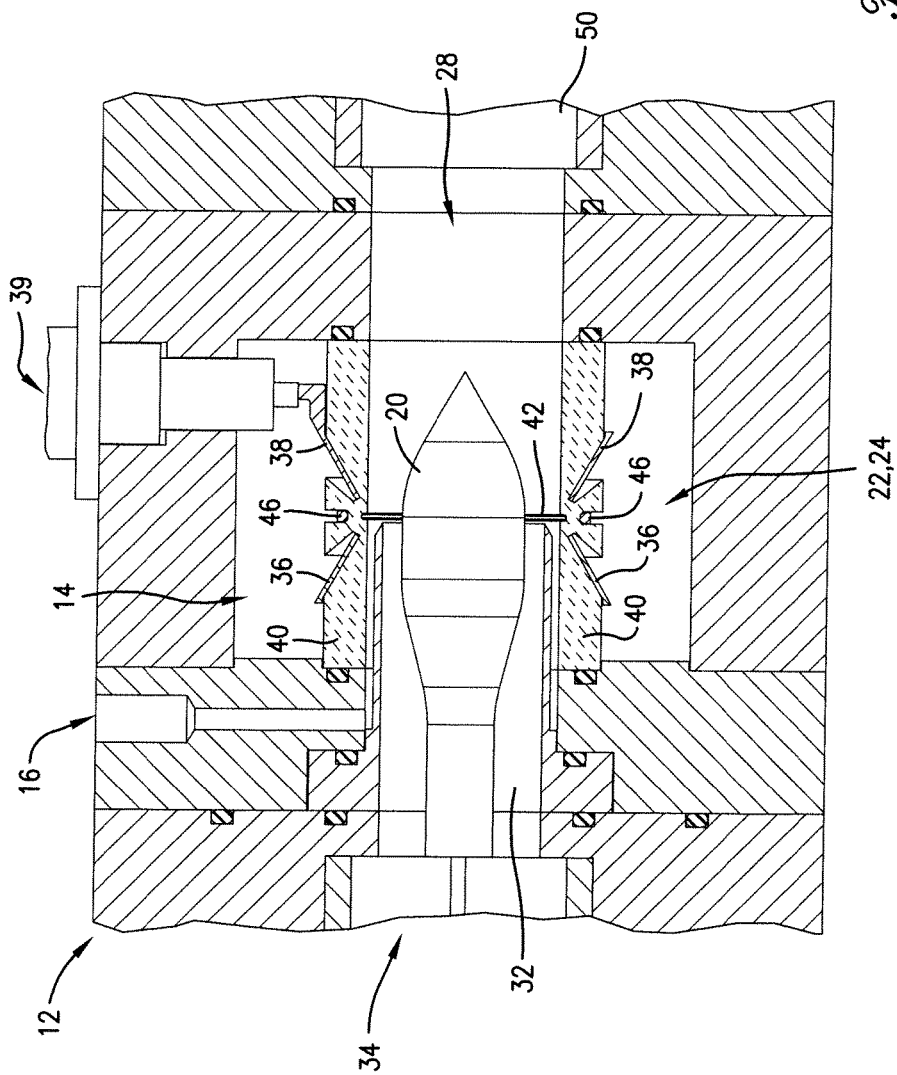
FIG. 3 is an enlargement of a portion of the sectional view of FIG. 2 showing the reactor chamber and the first and second electric field generators in more detail.

The housing 12, best seen in FIGS. 1 and 2, generally retains the components of the plasma reactor 10. In exemplary embodiments, the housing 12 may be mostly solid, except for the voids described below, and may have a box shape with two end surfaces and four side surfaces. The housing 12 may be formed from metals, plastics, ceramics, or the like. In some embodiments, the housing 12 may include a plurality of separately constructed sections which are assembled to form the housing 12. Internally, the housing 12 may include a lengthwise axial-aligned passageway 28, with an exemplary cylindrical shape, that extends from a first end surface through the center of the housing 12 to a second end surface, opposing the first end surface.

The reactor chamber 14, shown in FIGS. 2-6, generally provides a space where plasma of the first fluid is created. The reactor chamber 14 may have an exemplary cylindrical shape and may be positioned in the center of the housing 12 such that it couples with the passageway 28. Typically, the reactor chamber 14 has a diameter greater than the diameter of the passageway 28.

The first fluid inlet 16, shown in FIGS. 2-4 and 6, generally receives a first fluid into the plasma reactor 10. The first fluid is typically the low density fluid which may include a gas, such as oxygen, nitrogen, etc., although the first fluid may also include liquids or materials in a liquid state. The first fluid inlet 16 may include a generally cylindrical opening in the housing 12 extending from one of the side surfaces inward toward the passageway 28. There may be attachments, connectors, fittings, couplers, or so forth that connect to the first fluid inlet 16 on the side surface of the housing 12 in order to provide the first fluid from a first fluid source.

The second fluid inlet 18, shown in FIGS. 1 and 2, generally receives a second fluid into the plasma reactor 10. The second fluid is typically the high density fluid which may include a liquid, such as treated or untreated water, a liquid-state fuel, or the like, although the second fluid may also be a gas. The second fluid inlet 18 may include an inlet tube 30 and an inlet sleeve 32. The inlet tube 30 may be of hollow, cylindrical shape, may be coupled with the housing 12 through the first end surface, and may occupy a portion of the passageway 28. The inlet tube 30 may also include attachments, connectors, fittings, couplers, or so forth on the free end of the tube in order to couple the second fluid inlet 18 with second fluid sources. The inlet sleeve 32 may include a shoulder coupled to a hollow, cylindrical side wall with a smaller outer diameter than the shoulder and having at least one beveled edge along the outer circumference thereof. The inlet sleeve 32 may be positioned in the passageway 28 downstream from the inlet tube 30. The second fluid may flow along a generally straight axial path through the inlet tube 30, a portion of the passageway 28, and the inlet sleeve 32.

The second fluid inlet 18 may also define a portion of the path that the first fluid may follow toward the electric field generators 22, 24. The first fluid may flow through the first fluid inlet 16 to the passageway 28 where it may make a right angle turn and may flow along an outer surface of the inlet sleeve 32 of the second fluid inlet 18 and into the reactor chamber 14.

The venturi insert 20, shown in FIGS. 2-5, is an optional component which may be used with second fluids that have a high electrical impedance. The venturi insert 20 generally provides a decrease in fluid pressure of the first and second fluids downstream form the electric field generators 22, 24 within the passageway 28. The venturi insert 20 may include an elongated body with a folium cross-sectional shape that has a tubular first end and tapers to a point at a second, opposing end. The venturi insert 20 may be positioned along the passageway 28 within the reactor chamber 14. The venturi insert 20 may further include, or be in contact with, a positioning frame 34 which holds the venturi insert 20 in the proper location within the passageway 28. The positioning frame 34 may include a plurality of radially outward extending fins attached to a central tubular, hollow core. The positioning frame 34 may be located within the inlet tube 30 of the second fluid inlet 18 such that the fins contact the inner surface of the inlet tube 30. The core of the positioning frame 34 may receive the first end of the venturi insert 20 in order to maintain the position of the venturi insert 20.

The first electric field generator 22, shown in FIGS. 2-6, generally ionizes the first fluid to create a first fluid plasma and a plurality of free electrons. The first electric field generator 22 may include a first electrode 36, a second electrode 38, and a dielectric shell 40. The first electrode 36 may be formed from electrically conductive materials such as metals including iron, nickel, gold, copper, alloys thereof, or the like. In exemplary embodiments, the first electrode 36 may have a conical annular shape, or a frusto-conical shell shape. The first electrode 36 may have an inner diameter and circumference and an outer diameter and circumference, wherein the angle between the outer circumference and the inner circumference may range between approximately 30 degrees and approximately 60 degrees. In addition, the first electrode 36 may include a plurality of spaced-apart slots, each extending from the inner circumference toward the outer circumference. In other embodiments, the first electrode 36 may have an planar annular shape. In some embodiments, the second electrode 38 may be substantially the same as the first electrode 36 in composition and shape. In other embodiments, the second electrode 38 may have the same composition and basic shape as the first electrode 36, but may differ in size. For example, the inner diameter and circumference of the second electrode 38 may be larger or smaller than the inner diameter and circumference of the first electrode 36. Furthermore, the first electrode 36 may be electrically connected to a first connector 37, while the second electrode 38 may be electrically connected to a second connector 39. Each connector 37, 39 may be mechanically attached to the housing 12 and may connect to one or more external electric power sources or electronic circuits through an electrically conductive cable.

The dielectric shell 40 may be formed from non-conductive materials, such as plastics, ceramics, or other dielectric materials, with a high dielectric strength and a high electrical permittivity. The dielectric shell 40 may have a generally hollow cylindrical shape with a single circumferential side wall including an inner surface and an outer surface and a thickness defined by an outer diameter minus an inner diameter. In various embodiments, there may also be a circumferential groove 42 formed on the inner surface of the dielectric shell 40 roughly midway along the length of the shell 40. The first electrode 36 and the second electrode 38 may be embedded in the side wall along the axis of the dielectric shell 40 with a space between the two. Furthermore, the orientation of the first electrode 36 may be mirrored with regard to the orientation of the second electrode 38 such that there is a smaller distance between the inner circumferences of the two electrodes 36, 38 and a larger distance between the outer circumferences of the two electrodes 36, 38. There may be dielectric material between the inner circumferences of the two electrodes 36, 38 and dielectric material between the inner circumference of each electrode 36, 38 and the inner surface of the dielectric shell 40. In addition, the groove 42 may be positioned roughly midway between the first and second electrodes 36, 38.

The first electric field generator 22 may be positioned within the reactor chamber 14 of the housing 12. Other dielectric materials, such as ceramics, polymers, gases, or so forth, may surround the outer surface of the dielectric shell 40 and may fill the space of the reactor chamber 14—providing electrical isolation of the first electric field generator 22 and suppressing undesirable coronal discharge from the first and second electrodes 36, 38 and connectors 37, 39. The dielectric shell 40 may also be positioned along the passageway 28 such that a portion of the inlet sleeve 32 fits within a portion of the dielectric shell 40. In addition, there may be a space or gap between the outer surface of the dielectric shell 40 and the inner surface of the dielectric shell 40.

Figure 4:
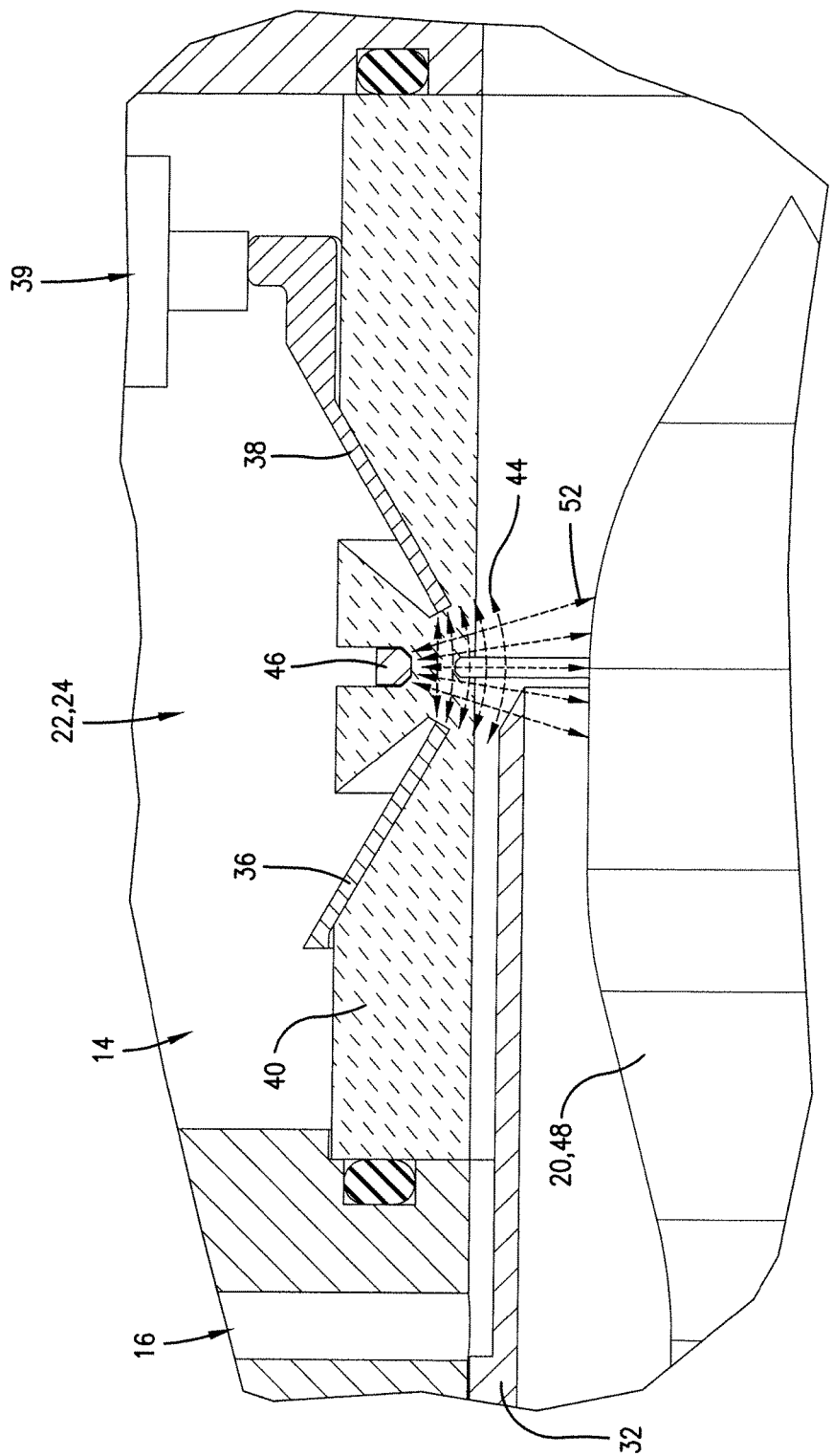
FIG. 4 is an enlargement of a portion of the sectional view of FIG. 3 showing a first electric field generated by the first electric field generator and a second electric field generated by the second electric field generator.
Figure 5:
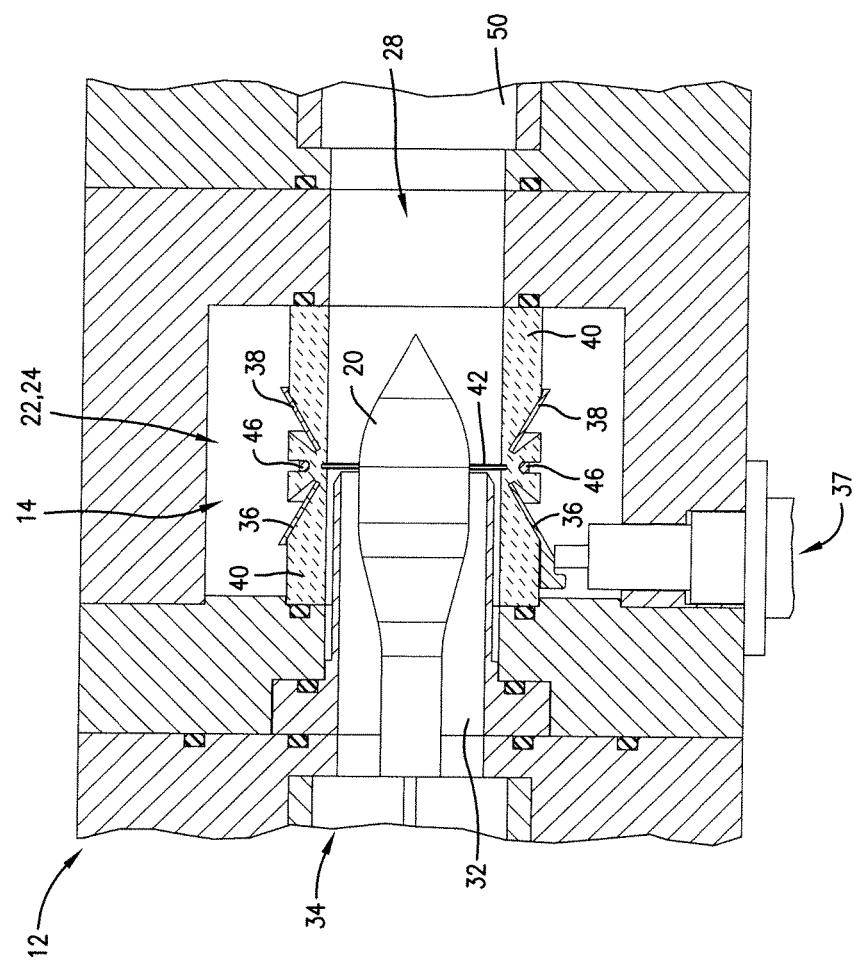
FIG. 5 is a partial sectional view of the plasma reactor cut along the line 5-5 from FIG. 1, illustrating the reactor chamber, the first electric field generator with a second electrode, and the second electric field generator.

When a voltage is applied to the electrodes 36, 38, a first electric field 44 is formed between the inner circumferences of the electrodes 36, 38, wherein a portion of the first electric field 44 protrudes into, or is positioned within, the passageway 28, as shown in FIG. 4.

The second electric field generator 24, shown in FIGS. 2-6, generally changes the direction, speed, or both of the ions of the first fluid and/or the free electrons. The second electric field generator 24 may include a first electrode 46 and a second electrode 48. The first electrode 46 may be formed from electrically conductive material and may have a generally ring shape with a half-elliptical, or half-oval, cross section, although it may have a circular cross section as well. The first electrode 46 may be positioned in an outer circumferential groove of the dielectric shell 40 of the first electric field generator 22 roughly midway between the first electrode 36 and the second electrode 38. Typically, an inner diameter of the first electrode 46 is greater than the inner diameters of the first and second electrodes 36, 38. The first electrode 46 may also be electrically connected to a third connector (not shown in the figures) which, through an electrically conductive cable, may provide electrical connection to one or more external electric power sources or electronic circuits.

Figure 6:
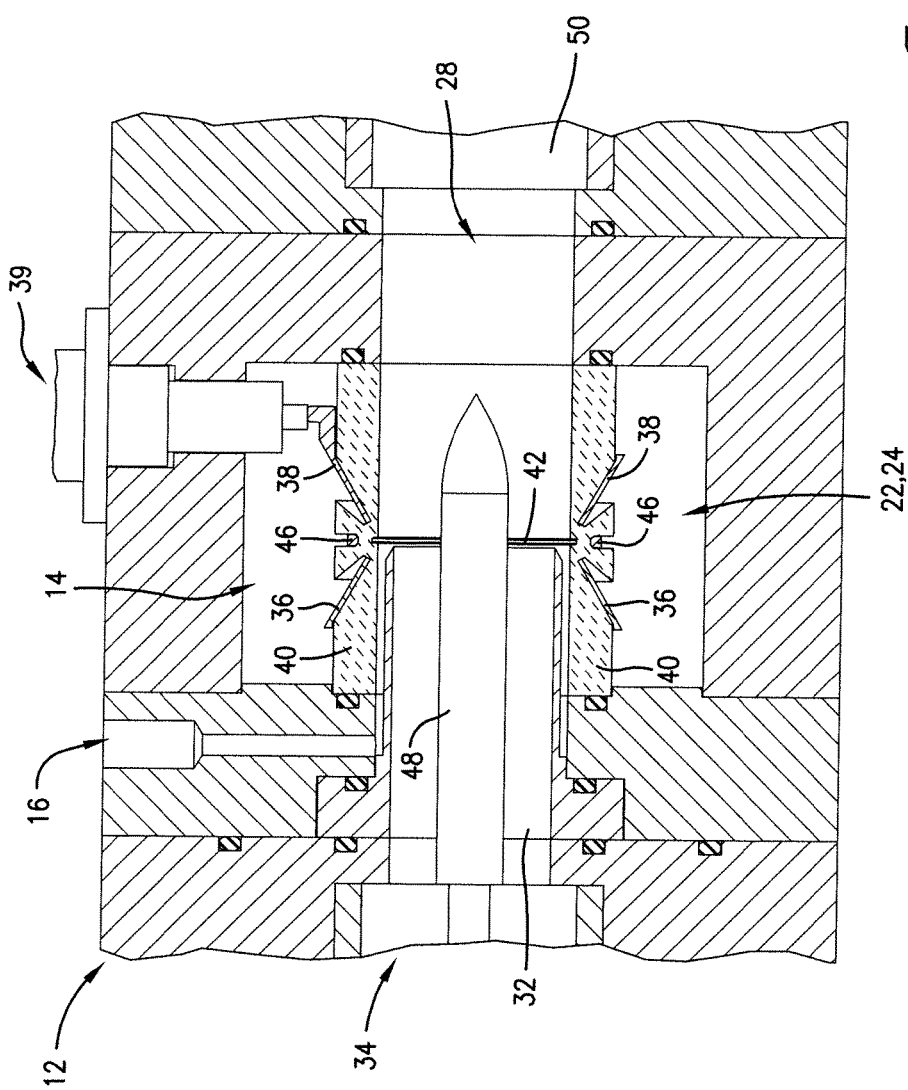
FIG. 6 is a sectional view of the plasma reactor similar to that of FIG. 2, except that the venturi insert has been removed revealing a second electrode of the second electric field generator.

The second electrode 48 is optional depending on the electrical nature of the second fluid. The second electrode 48 may be required for the second electric field generator 24 if the second fluid is electrically insulating or of high electrical impedance. The second electrode 48 may be omitted if the second fluid is conductive and/or ionized. The second electrode 48 may also be formed from electrically conductive material. In some embodiments, the second electrode 48 may optionally be coated with an outer layer of dielectric material on top of the electrically conductive material. In exemplary embodiments, the second electrode 48 may have a body with a generally elongated tubular shape including a first end adapted to couple with the positioning frame 34 (or similar structure) and a second end that tapers to a point, as seen in FIG. 6. If the second electrode 48 is utilized, then it may be positioned along the passageway 28 such that it lies within the plane of the first electrode 46. Furthermore, through the positioning frame 34, the second electrode 48 may be electrically connected to a system electrical ground or external electric power sources or electronic circuits. If the venturi insert 20 is utilized and the second electrode 48 is necessary, then the second electrode 48 may be embodied by the venturi insert 20 itself.

In alternative embodiments, the second electrode 48 may be formed from a rod or a wire of electrically conductive material and may include a connected end, electrically connected to a system electrical ground or external electric power sources or electronic circuits, and a free end. The second electrode 48 may be positioned along the central axis of the passageway 28 such that the free end is located in the vicinity of the plane of the first electrode 46 or downstream from the plane of the first electrode 46.

The effluent outlet 26, shown in FIGS. 1 and 2, generally provides a path for the effluent (the second fluid enriched with, or modified by, at least a portion of the first fluid) to exit the plasma reactor 10. The effluent outlet 26 may include an outlet tube 50, which may be of hollow, cylindrical shape, may be coupled with the housing 12 through the second end surface, and may occupy a portion of the passageway 28. The outlet tube 50 may also include attachments, connectors, fittings, couplers, or so forth on the free end of the tube in order to couple the effluent outlet 26 with destinations to receive the effluent.

The plasma reactor 10 may operate as follows. The first fluid may be supplied from an external source and may be received by the first fluid inlet 16. The first fluid may be supplied at approximately atmospheric pressure or may be pressurized at up to approximately 100 pounds per square inch gage (psig). The first fluid may flow through the first fluid inlet 16 to the outer surface of the inlet sleeve 32 where it may then flow in the space between the outer surface of the inlet sleeve 32 and the inner surface of the dielectric shell 40.

The second fluid may be supplied by an external source and may be received by the second fluid inlet 18. The second fluid may be supplied at modest pressure and may flow into and through the inlet tube 30. If either the venturi insert 20 or the second electrode 48 is utilized, then the second fluid may flow through the positioning frame 34. In any circumstance, the second fluid may flow into and through the inlet sleeve 32. If either the venturi insert 20 or the second electrode 48 is utilized, then the second fluid may flow around the venturi insert 20 or the second electrode 48 until the second fluid exits the inlet sleeve 32. The first fluid may flow past the beveled edge of the inlet sleeve 32 and join the flow of the second fluid as it exits the inlet sleeve 32.

The first electric field 44, as seen in FIG. 4, may be created by applying a voltage difference between the first and second electrodes 36, 38 of the first electric field generator 22. The voltage difference may be produced by a first electronic signal received by the first and second electrodes 36, 38, wherein the first electronic signal may be a balanced or an unbalanced signal, an alternating current (AC) or a direct current (DC) signal, steady state or varying, or combinations thereof. The first electronic signal may also include a sequence of pulses, periodic waveforms such as sine, square, triangle, sawtooth, etc., or combinations thereof. In exemplary embodiments, the first electronic signal may include a voltage ranging from approximately 1 kilovolt (kV) AC to approximately 50 kV AC with an optional DC offset bias ranging from approximately 1 V to approximately 10 kV. In some embodiments, the second electrode 38 may receive a voltage waveform that is an inverse of the voltage waveform for the first electrode 36. In other embodiments, one electrode may be held at a constant voltage while the voltage of the other electrode is varied.

The first electric field 44 may be positioned in the space between the first and second electrodes 36, 38, particularly the dielectric shell 40 between the inner circumferences of the first and second electrodes 36, 38. Given the circular shape of the first and second electrodes 36, 38, at least a portion of the first electric field 44 may have a general hollow or open cylindrical shape. The first electric field 44 may also extend into the passageway 28 just as the first fluid flows past the beveled edge of the inlet sleeve 32 and joins the flow of the second fluid. At least a portion of the first electric field 44 may be roughly axially oriented, so that the first fluid may flow through the first electric field 44 roughly in line with, in the same direction as, or parallel to, the lines of the first electric field 44. If the groove 42 is present in the dielectric shell 40, then the first electric field 44 may be concentrated or greater in strength in the space of the groove 42, which in turn, may reduce the magnitude or peak-to-peak value of voltage needed to create the first electric field 44.

The first electric field 44 may strip off electrons from the first fluid atoms and/or molecules to create a plasma of positive ions of the first fluid. This may also be referred to as "igniting" the plasma. In embodiments that include the groove 42, the groove 42 may cause an eddy in the flow of the first fluid and may create a region of lower pressure for the first fluid. Within the groove 42, the concentrated first electric field 44 may prematurely break down the first fluid leading to an early onset of the plasma ignition. Once ions are present, the permittivity of the first fluid may increase rapidly, and the plasma may expand to some quasi-equilibrium condition, filling the groove 42 and the regions adjacent to it. At least a portion of the ions of the first fluid may then drift into and mix with or bond with atoms and/or molecules of the second fluid to create the effluent. The effluent may then flow along the passageway 28 through the outlet tube 50 of the effluent outlet 26 and on to a destination for the effluent.

In certain usage applications of the plasma reactor 10, the second electric field generator 24 may not be utilized because the plasma injection of the first fluid into the second fluid is sufficient using only the first electric field generator 22. However, when greater control of the plasma injection is required, the second electric field generator 24 may be utilized. A second electric field 52, seen in FIG. 4, may be created by applying a voltage difference between the first and second electrodes 46, 48 of the second electric field generator 24. The voltage difference may be produced by a second electronic signal received by the first and second electrodes 46, 48. Like the first electronic signal, the second electronic signal may be a balanced or an unbalanced signal, an AC or a DC signal, steady state or varying, or combinations thereof, and may also include a sequence of pulses, periodic waveforms such as sine, square, triangle, sawtooth, etc., or combinations thereof. In some embodiments, the second electrode 38 may receive a voltage waveform that is an inverse of the voltage waveform for the first electrode 36. In other embodiments, one electrode may be held at a constant voltage while the voltage of the other electrode is varied. In embodiments in which the second electrode 48 is not used (because the second fluid is conductive or ionized), the first electrode 46 alone may receive a varying or constant voltage in order to create the second electric field 52. Given the configuration of the first and second electrodes 46, 48, at least a portion of the second electric field 52 may have an annular shape with the first electrode 46 defining the outer diameter of the annulus and the second electrode 48 or the second fluid defining the inner diameter of the annulus. The second electric field 52 may be oriented transverse to the axis of the passageway 28 and transverse to the first electric field 44, through which lines of the second electric field 52 may pass.

The second electric field 52 may be applied to direct the motion of the plasma ions, the electrons, or both. The second electric field 52 may force the plasma ions inward toward the central axis of the passageway 28 and into the stream of the second fluid, thereby increasing or enhancing the mixing and/or bonding of the plasma ions and the second fluid. The second electric field 52 may additionally or alternatively force the electrons away from the plasma in order to reduce the electrons recombining with the ions and neutralizing the first fluid.

A second embodiment of a plasma reactor 100 is shown in FIGS. 7-10. The plasma reactor 100 may also receive a first fluid and a second fluid as inputs, such that the first fluid may be ionized to form a plasma which is injected with the second fluid to create an effluent. The plasma reactor 100 may broadly comprise a housing 112, a reactor chamber 114, a first fluid inlet 116, a second fluid inlet 118, a venturi insert 120, a first electric field generator 122, a second electric field generator 124, and an effluent outlet 126. The plasma reactor 100 may also comprise a plurality of gaskets or seals, such as O-ring seals, that are positioned at the interfaces between various components of the reactor 100.

Figure 7:
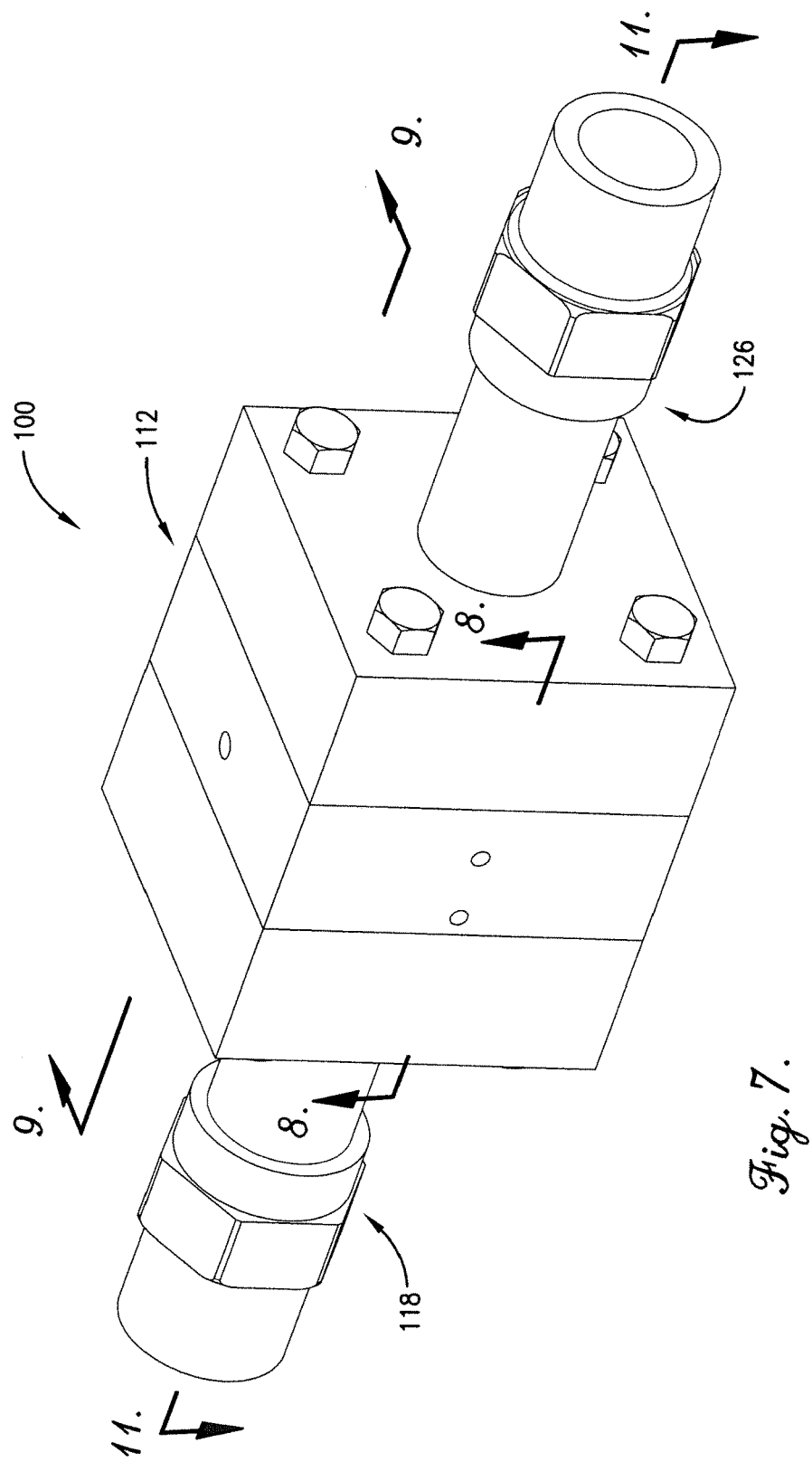
FIG. 7 is a perspective view of a plasma reactor, constructed in accordance with another embodiment of the current invention.
Figure 8:
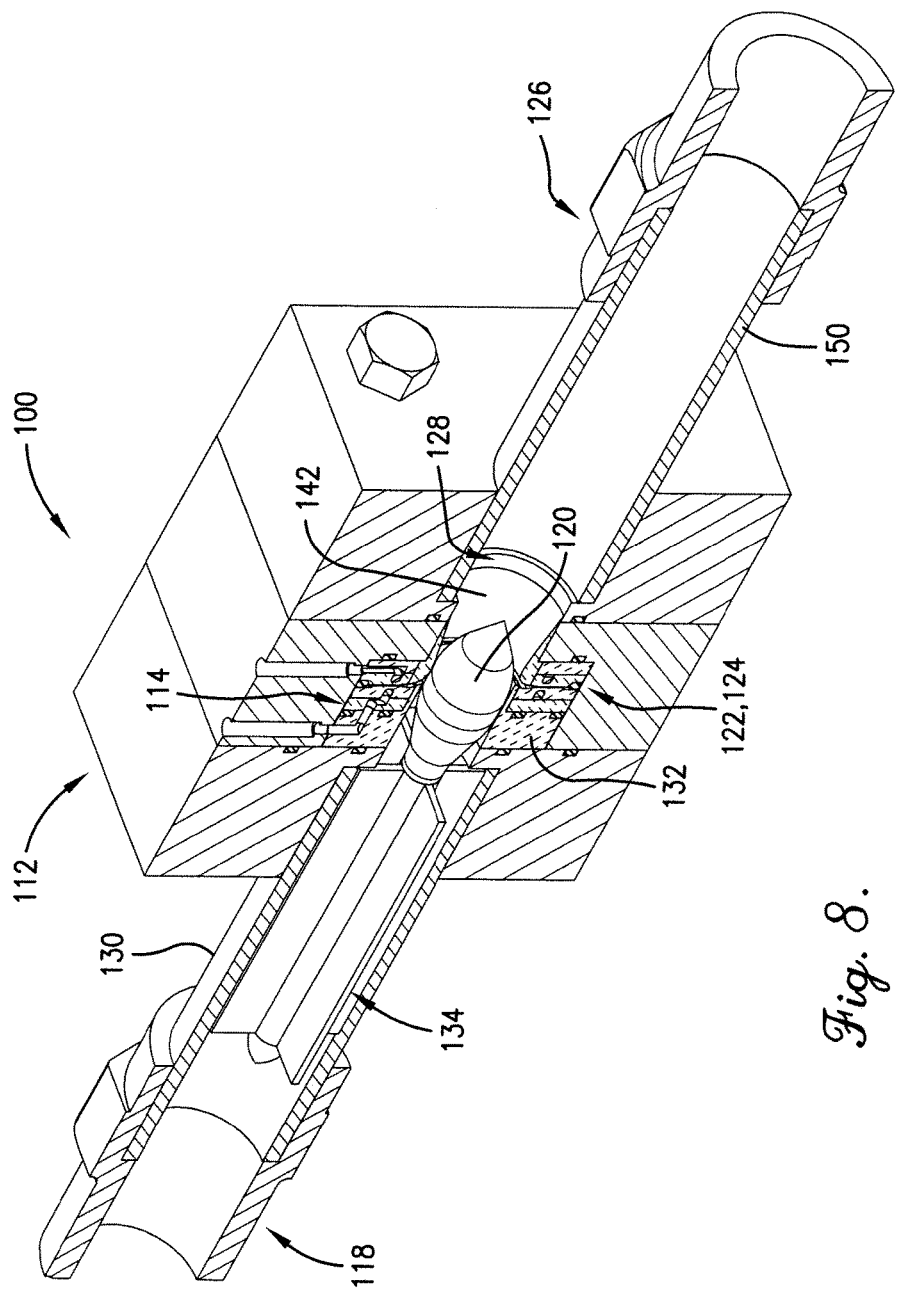
FIG. 8 is a sectional view of the plasma reactor cut along the line 8-8 from FIG. 7, illustrating a housing, a reactor chamber, a first fluid inlet, a second fluid inlet, a venturi insert, a first electric field generator with a first electrode, a second electric field generator, and an effluent outlet.

The housing 112, best seen in FIGS. 7 and 8, may be substantially similar to the housing 12 and may have a box shape with two end surfaces and four side surfaces. The housing 112 may also include a lengthwise axial-aligned passageway 128 substantially similar to the passageway 28. In addition, the reactor chamber 114 may be substantially similar to the reactor chamber 14.

The first fluid inlet 116, shown in FIGS. 9 and 10, generally receives the first fluid into the plasma reactor 100 and may include a generally cylindrical opening in the housing 112 extending from one of the side surfaces inward toward the reactor chamber 114.

The second fluid inlet 118, shown in FIGS. 7 and 8, may be substantially similar to the second fluid inlet 18 and may include an inlet tube 130 and an inlet sleeve 132, both similar to like-named components discussed above.

The venturi insert 120, shown in FIGS. 8-10, is also optional in the plasma reactor 100 and may be substantially similar to the venturi insert 20. Furthermore, if necessary, the plasma reactor 100 may include a positioning frame 134, substantially similar to the positioning frame 34.

The first electric field generator 122, shown in FIGS. 8-10, generally ionizes the first fluid to create a first fluid plasma and a plurality of free electrons. Its structure and operation may be different from the first electric field generator 22. The first electric field generator 122 may include a first electrode 136, a second electrode 138, a first dielectric shell 140, a second dielectric shell 141, and a dielectric sleeve 142. The first electrode 136 may be formed from electrically conductive material and have a generally ring shape. In exemplary embodiments, the first electrode 136 may have a roughly U-shaped cross section such that the first electrode 136 may include a roughly planar inner surface, a roughly planar outer surface, a roughly planar first side surface, and a curved or arcuate second side surface opposing the planar side surface. The first electrode 136 may have an inner diameter and circumference and an outer diameter and circumference. The second electrode 138 may be substantially similar to the first electrode 136, although in some embodiments, the inner diameter and/or the outer diameter of the second electrode 138 may be different from the inner diameter and/or the outer diameter, respectively, of the first electrode 136.

The first and second dielectric shells 140, 141, shown in FIGS. 8-10, may be formed from non-conductive materials with a high dielectric strength and a high electrical permittivity. The first dielectric shell 140 may have a roughly annular shape with first and second side surfaces, an inner surface having an inner diameter and circumference, and an outer surface having an outer diameter and circumference. The first dielectric shell 140 may also have a thickness in the axial direction. In addition, the second side surface may include a shallow channel that tapers inward near the inner surface. Furthermore, the first dielectric shell 140 may have a roughly cylindrical first opening extending from the outer surface radially inward for a short distance where it connects with a roughly cylindrical second opening extending axially toward the second side surface. The second dielectric shell 141 may also have a roughly annular shape with first and second side surfaces, an inner surface having an inner diameter and circumference, and an outer surface having an outer diameter and circumference. And, the second dielectric shell 141 may have a thickness in the axial direction. Furthermore, the first side surface may be beveled at the intersection with the inner surface. In exemplary embodiments, the inner diameter of the second dielectric shell 141 may be greater than the inner diameter of the first dielectric shell 140.

The dielectric sleeve 142, shown in FIGS. 8-10, may be formed from non-conductive materials with a high dielectric strength and a high electrical permittivity. The dielectric sleeve 142 may have a generally hollow cylindrical shape with a circumferential sidewall including an axial first end and an axial second end. An inner surface of the sidewall may be curved radially inward at the first end and may taper radially outward at the second end.

The first electric field generator 122 may have a construction as follows. The first and second dielectric shells 140, 141 may be positioned adjacent one another with the second side surface of the first dielectric shell 140 facing the first side surface of the second dielectric shell 141. There may be a gap between the two side surfaces. The first and second dielectric shells 140, 141 may be positioned within the reactor chamber 114 of the housing 112 such that the outer surfaces of the shells 140, 141 contact or face the inner surface of the reactor chamber 114. The first electrode 136 may be positioned within the interior of the first dielectric shell 140 in close proximity to the second side surface. The second electrode 138 may be positioned within the interior of the second dielectric shell 141 in close proximity to the first side surface. The second electrode 138 may have an orientation within the second dielectric shell 141 that mirrors the orientation of the first electrode 136 within the first dielectric shell 140. In exemplary embodiments, the curved surface of the first electrode 136 faces the curved surface of the second electrode 138.

At least a portion of the dielectric sleeve 142 may be positioned within the central space of the second dielectric shell 141 such that a portion of the outer surface of the dielectric sleeve 142 faces or contacts the inner surface of the second dielectric shell 141. Furthermore, the first end of the dielectric sleeve 142 may face the second side surface of the first dielectric shell 140. The central axis of the first electric field generator 122, including the first and second dielectric shells 140, 141 and the dielectric sleeve 142, may be aligned with the central axis of the passageway 128.

In addition, at least a portion of the inlet sleeve 132 of the second fluid inlet 118 may be positioned within the central space of the first dielectric sleeve 142 such that a portion of the outer surface of the inlet sleeve 132 contacts or faces the inner surface of the first dielectric sleeve 142.

The second electric field generator 124, shown in FIGS. 8-10, may be substantially similar to the second electric field generator 24 in structure and may include a first electrode 146 and a second electrode 148, with each being substantially similar to the like-named components discussed above. In other embodiments, the second electric field generator 124 may include additional electrodes. The first electrode 146 may be formed from electrically conductive material and may optionally be coated entirely with a dielectric material. The first electrode 146 may be positioned generally in a location where it can assert a force on the plasma of the first fluid. In various embodiments, the first electrode 146 may have a greater diameter and circumference than the first and second electrodes 136, 138 of the first electric field generator 122 and may be positioned radially outward from the first and second electrodes 136, 138 roughly midway between the two electrodes 136, 138. In exemplary embodiments, the first electrode 146 may be positioned in a groove on the second side surface of the first dielectric shell 140 which faces the first side surface of the second dielectric shell 141. Thus, the first electrode 146 may be positioned in the gap between the two dielectric shells 140, 141. The second electrode 148 may also be optional and may be embodied by either a smaller diameter tube of the larger diameter venturi insert 120.

The effluent outlet 126, shown in FIGS. 7 and 8, may be substantially similar to the effluent outlet 26 and may include an outlet tube 150, also substantially similar to the outlet tube 50.

The plasma reactor 100 may operate as follows. The first fluid may be supplied from an external source and may be received by the first fluid inlet 116. The first fluid may be supplied at approximately atmospheric pressure or may be pressurized at up to approximately 100 pounds per square inch gage (psig). The first fluid may flow through the first fluid inlet 116 into the first opening of the first dielectric shell 140 and out of the second opening. The first fluid may then flow radially inward through the gap between the first and second dielectric shells 140, 141.

The second fluid may be supplied by an external source and may be received by the second fluid inlet 118. The second fluid may be supplied at modest pressure and may flow into and through the inlet tube 130. If either the venturi insert 120 or the second electrode 148 is utilized, then the second fluid may flow through the positioning frame 134. In any circumstance, the second fluid may flow into and through the inlet sleeve 132. If either the venturi insert 120 or the second electrode 148 is utilized, then the second fluid may flow around the venturi insert 120 or the second electrode 148 until the second fluid exits the inlet sleeve 132. The first fluid may flow past the beveled edge of the inlet sleeve 132.

A first "plasma generating" electric field 144, shown in FIG. 10, may be created by applying a voltage difference between the first and second electrodes 136, 138 of the first electric field generator 122. The voltage difference may be produced by a first electronic signal received by the first and second electrodes 136, 138, wherein the first electronic signal may be a balanced or an unbalanced signal, an alternating current (AC) or a direct current (DC) signal, steady state or varying, or combinations thereof. The first electronic signal may also include a sequence of pulses, periodic waveforms such as sine, square, triangle, sawtooth, etc., or combinations thereof. In some embodiments, the second electrode 138 may receive a voltage waveform that is an inverse of the voltage waveform for the first electrode 136. In other embodiments, one electrode may be held at a constant voltage while the voltage of the other electrode is varied. In exemplary embodiments, the first electronic signal may include a pulsed voltage with a pulse repetition rate ranging from approximately 1 kiloHertz (kHz) to approximately 1 megahertz (MHz). The voltage level of one pulse may range from approximately 3 kV peak to peak (pp) to 12 kV pp with a DC offset bias ranging from approximately +/−50 V to +/−1.5 kV. The pulse width may range from approximately 30 nanoseconds (ns) to approximately 200 ns. Other exemplary implementations may include a 1 MHz repetition rate with a 10 kV pp amplitude and a 50 ns pulse width, yielding roughly 3 kilowatts (kW) of power. Still other exemplary implementations may include a 50-100 kHz repetition rate with a 10 kV pp amplitude and a 50 ns pulse width, yielding roughly 200-400 W of power.

The first plasma generating electric field 144 may be positioned in the space between the first and second electrodes 136, 138, including the first and second dielectric shells 140, 141 and the gap therebetween. At least a portion of the first electric field 144 may have a generally hollow or open cylindrical shape and it may cross the gap between the first and second dielectric shells 140, 141. As the first fluid flows along the gap, it may flow through the first electric field 144 in a direction roughly transverse to the lines of the first electric field 144. The first electric field 144 may strip off electrons from the first fluid atoms and/or molecules to create a plasma of positive ions of the first fluid. The first fluid may flow out of the gap as a plasma and may encounter the channel near the inner edge of the second side surface of the first dielectric shell 140, the beveled edge of the inlet sleeve 132, and the contoured inner surface of the dielectric sleeve 142, all of which serve to guide the plasma in the same direction as the stream of the second fluid and inject the plasma into the second fluid. At least a portion of the ions of the plasma may then bond with atoms and/or molecules of the second fluid to create the effluent. The effluent may then flow along the passageway 128 through the outlet tube 150 of the effluent outlet 126 and on to a destination for the effluent.

As discussed with the plasma reactor 10 above, in some situations, the plasma reactor 100 may utilize the second electric field generator 124 to provide greater control of the plasma injection. A second electric field 152, seen in FIG. 10, may be created by applying a voltage difference between the first and second electrodes 146, 148 of the second electric field generator 124. The voltage difference may be produced by a second electronic signal received by the first and second electrodes 146, 148. Like the first electronic signal, the second electronic signal may be a balanced or an unbalanced signal, an AC or a DC signal, steady state or varying, or combinations thereof, and may also include a sequence of pulses, periodic waveforms such as sine, square, triangle, sawtooth, etc., or combinations thereof. In some embodiments, the second electrode 148 may receive a voltage waveform that is an inverse of the voltage waveform for the first electrode 146. In other embodiments, one electrode may be held at a constant voltage while the voltage of the other electrode is varied. In embodiments in which the second electrode 148 is not used (because the second fluid is conductive or ionized), the first electrode 146 alone may receive a varying or constant voltage in order to create the second electric field 152. In exemplary embodiments, the first electrode 146 may receive a voltage up to approximately +/−2,500 V DC, while the second electrode 148 is held at ground. Given the configuration of the first and second electrodes 146, 148, at least a portion of the second electric field 152 may have an annular shape with the first electrode 146 defining the outer diameter of the annulus and the second electrode 148 or the second fluid defining the inner diameter of the annulus. The second electric field 152 may be oriented transverse to the axis of the passageway 128 and transverse to the first electric field 144, through which lines of the second electric field 152 may pass.

The second electric field 152 may be applied to direct the motion of the plasma ions, the electrons, or both. For example, if the first fluid includes nitrogen gas, then the first electrode 146 may be uncoated and may receive a positive voltage, while the second electrode 148 is held at electrical ground. This configuration may enhance plasma ion injection into the second fluid, while at the same time, urging electrons toward the first electrode 146, which may be positioned along the path of the flow of the first fluid.

FIGS. 11-21 illustrate various embodiments of electric field generators that may be integrated with the plasma reactor 10 or the plasma reactor 100. The electric field generators shown may be utilized in addition to, or instead of, the electric field generators described above. In addition, the electric field generators may be positioned in the reactor chamber and may couple with the passageway.

Figure 12:
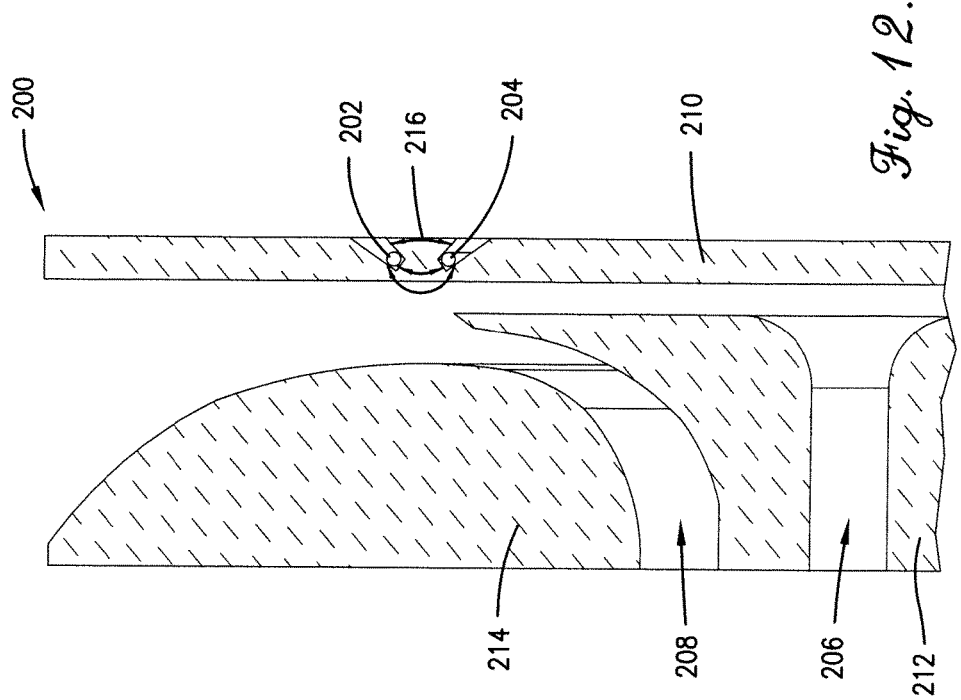
FIG. 12 is a side sectional view of the first alternative electric field generator of FIG. 11.
Figure 11:
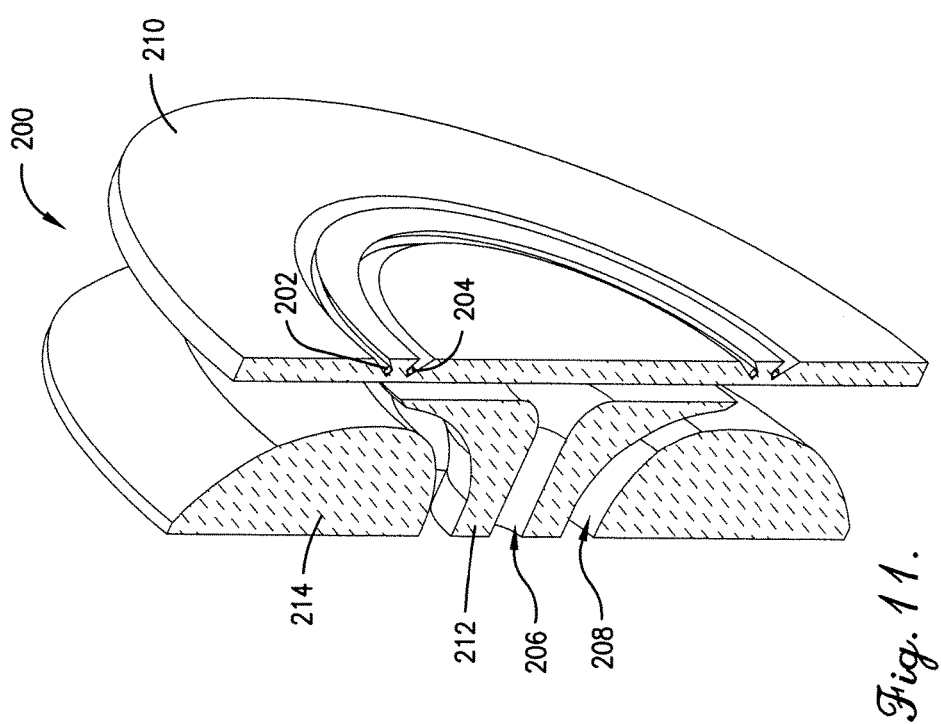
FIG. 11 is a perspective sectional view of a first alternative electric field generator.

An electric field generator 200, shown in FIGS. 11-12, may include a first electrode 202, a second electrode 204, a first fluid path 206, and a second fluid path 208. The first and second electrodes 202, 204 may each have a ring shape wherein a diameter of the first electrode 202 is greater than a diameter of the second electrode 204. The first and second electrodes 202, 204 may be embedded concentrically in a dielectric disc 210, with the second electrode 204 being positioned radially inward from the first electrode 202. The first and second electrodes 202, 204 may generate an electric field 216 with a roughly annular shape, a portion of which may extend outside of the dielectric disc 210.

The first fluid path 206 may be provided by a funnel 212 with a central passageway leading to a radially outward extending flange. The second fluid path 208 may be provided by a cylindrical shell 214 which surrounds the funnel 212 and provides a passageway in a space between the funnel 212 and the shell 214. The funnel 212 may be positioned adjacent to the dielectric disc 210 such that there is a small space therebetween. A first fluid may flow along the first fluid path 206 until it encounters the dielectric disc 210, at which point, the first fluid may spread radially outward and flow through the electric field 216. The electric field 216 may create a plasma of the first fluid. The second fluid may flow through the second fluid path 208 until it encounters the flange and a curved edge of the shell 214, both of which urge the second fluid to flow radially outward where it joins the flow of the first fluid plasma. At least a portion of the plasma may be injected into the second fluid to create an effluent.

Figure 13:
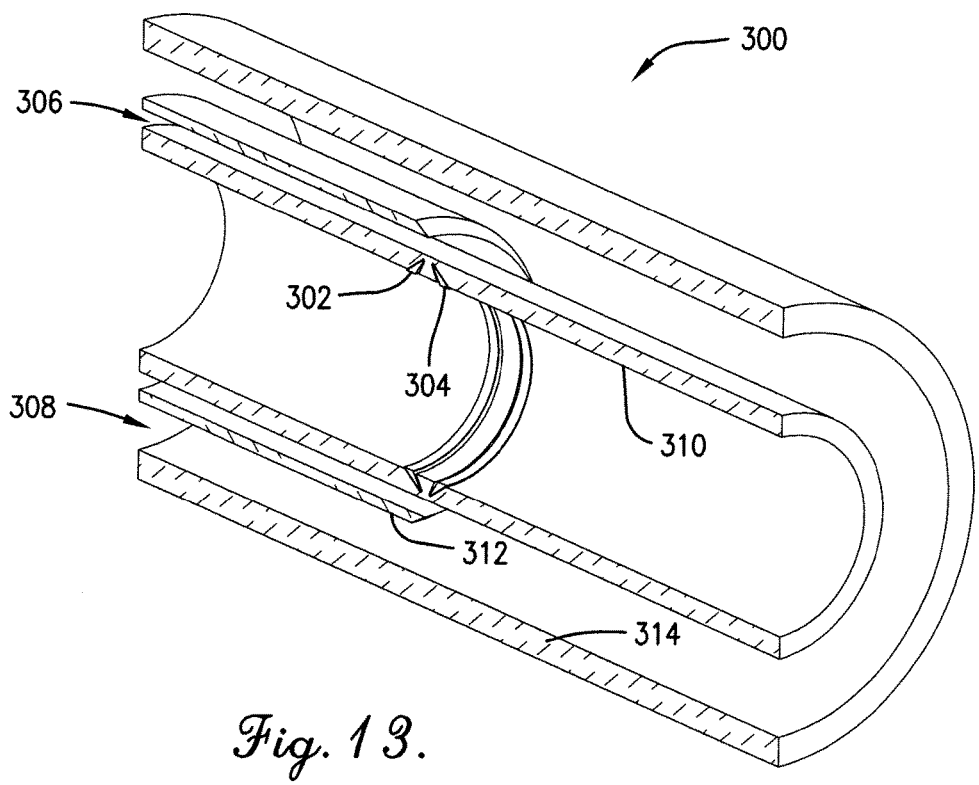
FIG. 13 is a perspective sectional view of a second alternative electric field generator.
Figure 14:
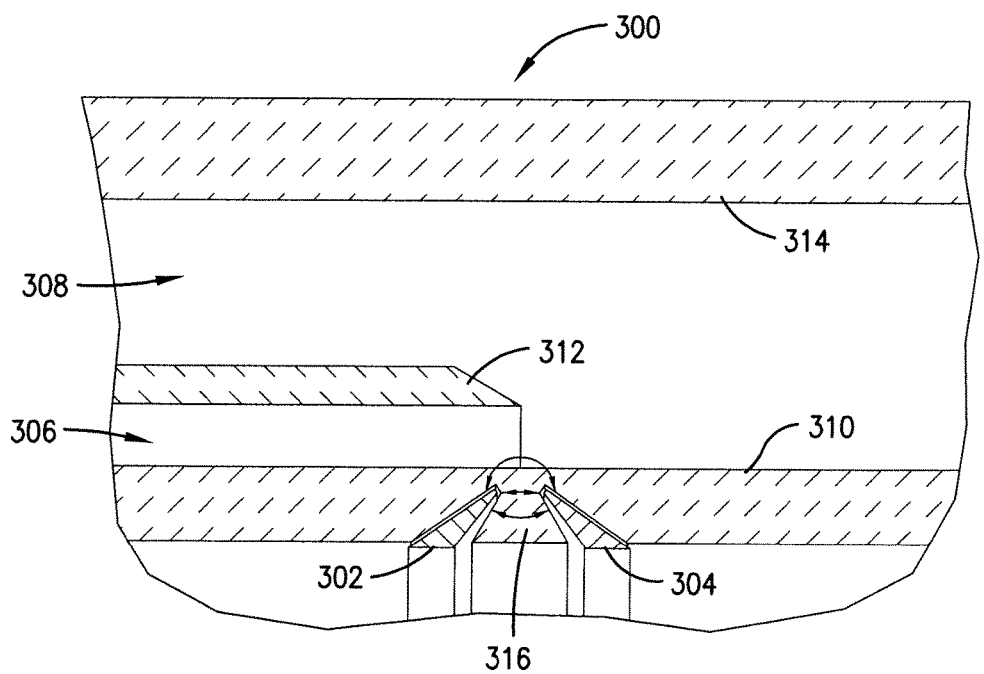
FIG. 14 is a side sectional view of a portion of the second alternative electric field generator of FIG. 13.

An electric field generator 300, shown in FIGS. 13-14, may include a first electrode 302, a second electrode 304, a first fluid path 306, and a second fluid path 308. The first and second electrodes 302, 304 may each have a conical annular shape and may have the same inner diameter and outer diameter. The first and second electrodes 302, 304 may be embedded in a cylindrical dielectric shell 310, spaced apart axially and oriented to mirror one another. The first and second electrodes 302, 304 may generate an electric field 316 with a roughly cylindrical shape, a portion of which may extend radially outward from the dielectric shell 310.

The first fluid path 306 may be provided by a space between an outer surface of the dielectric shell 310 and an inner surface of a cylindrical first fluid shell 312. The first fluid shell 312 may include a beveled outer surface edge which is positioned opposite of the first and second electrodes 302, 304. The second fluid path 308 may be provided by a space between an outer surface of the first fluid shell 312 and an inner surface of a cylindrical second fluid shell 314. A first fluid may flow along the first fluid path 306 until it reached the edge of the first fluid shell 312, at which point, the first fluid flows through the electric field 316, thus creating a plasma. The second fluid may flow through the second fluid path 308 until it encounters the beveled edge of the first fluid shell 312 which may encourage a portion of the second fluid to drift into the flow of the plasma. At least a portion of the plasma may be injected into the second fluid to create an effluent.

Figure 15:
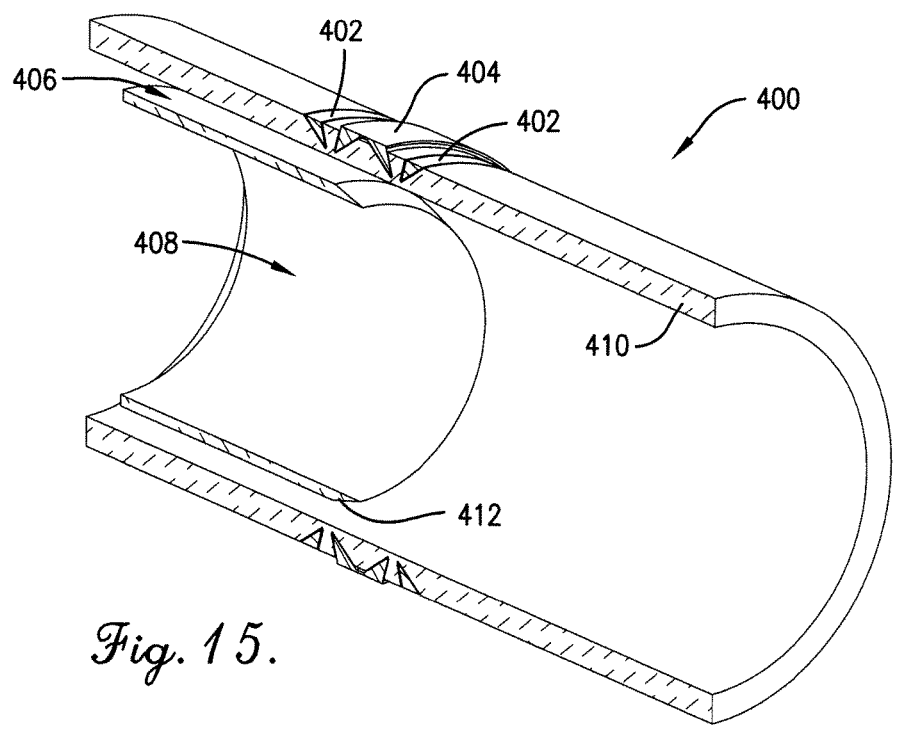
FIG. 15 is a perspective sectional view of a third alternative electric field generator.
Figure 16:
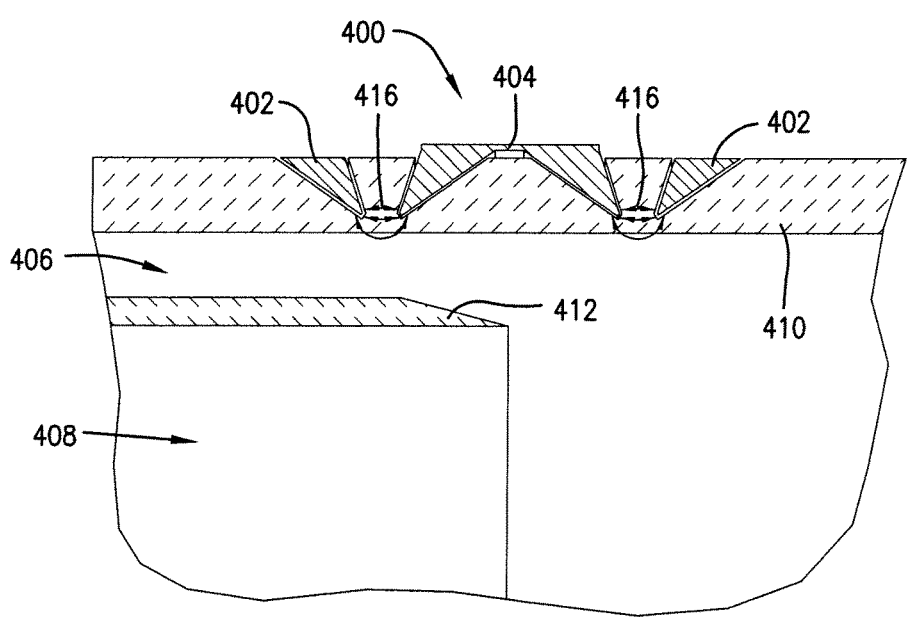
FIG. 16 is a side sectional view of a portion of the third alternative electric field generator of FIG. 15.
Figure 17:
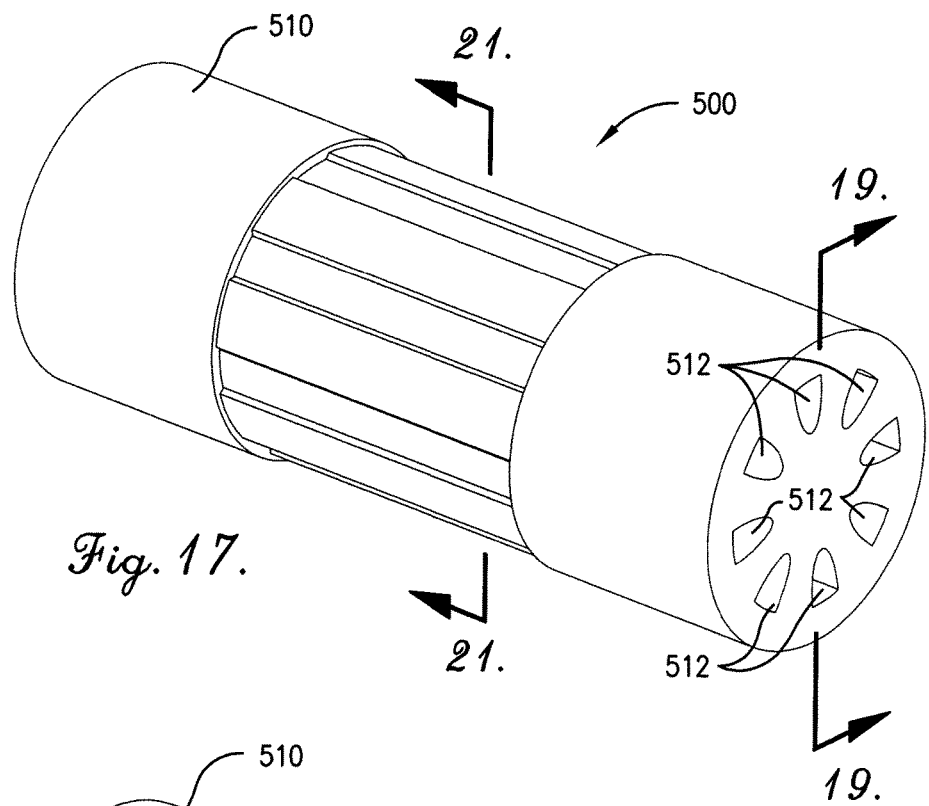
FIG. 17 is a forward perspective view of a fourth alternative electric field generator.
Figure 18:
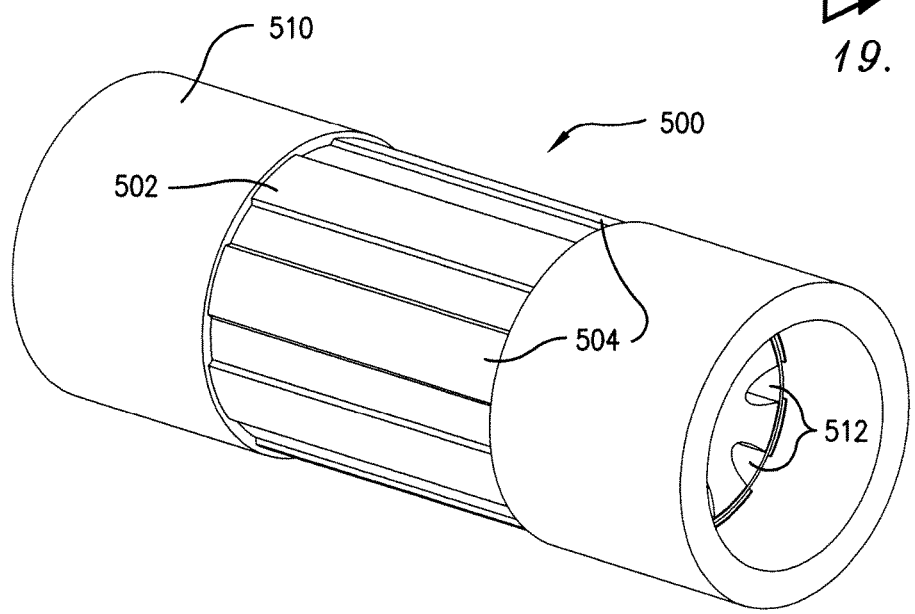
FIG. 18 is a rear perspective view of the fourth alternative electric field generator of FIG. 17.
Figure 19:
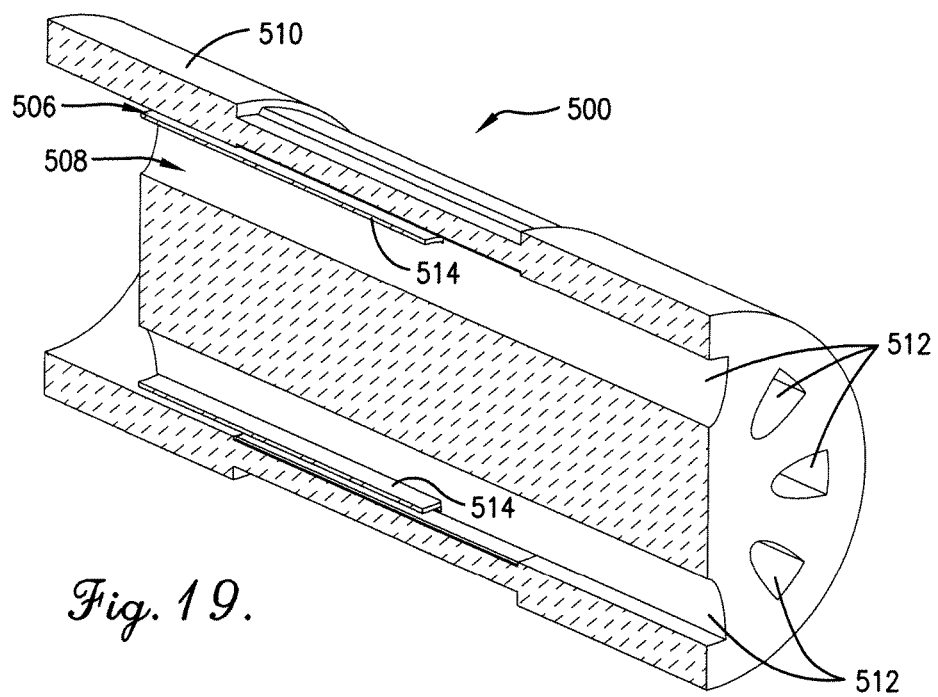
FIG. 19 is a forward perspective sectional view of the fourth alternative electric field generator cut along the line 19-19 from FIG. 17.
Figure 20:
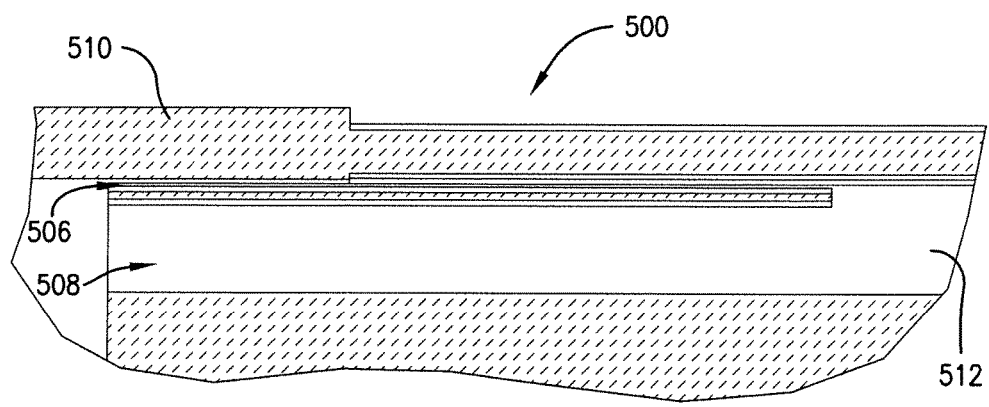
FIG. 20 is an enlargement of a portion of the sectional view of FIG. 19 showing a first fluid path and a second fluid path in more detail.
Figure 21:
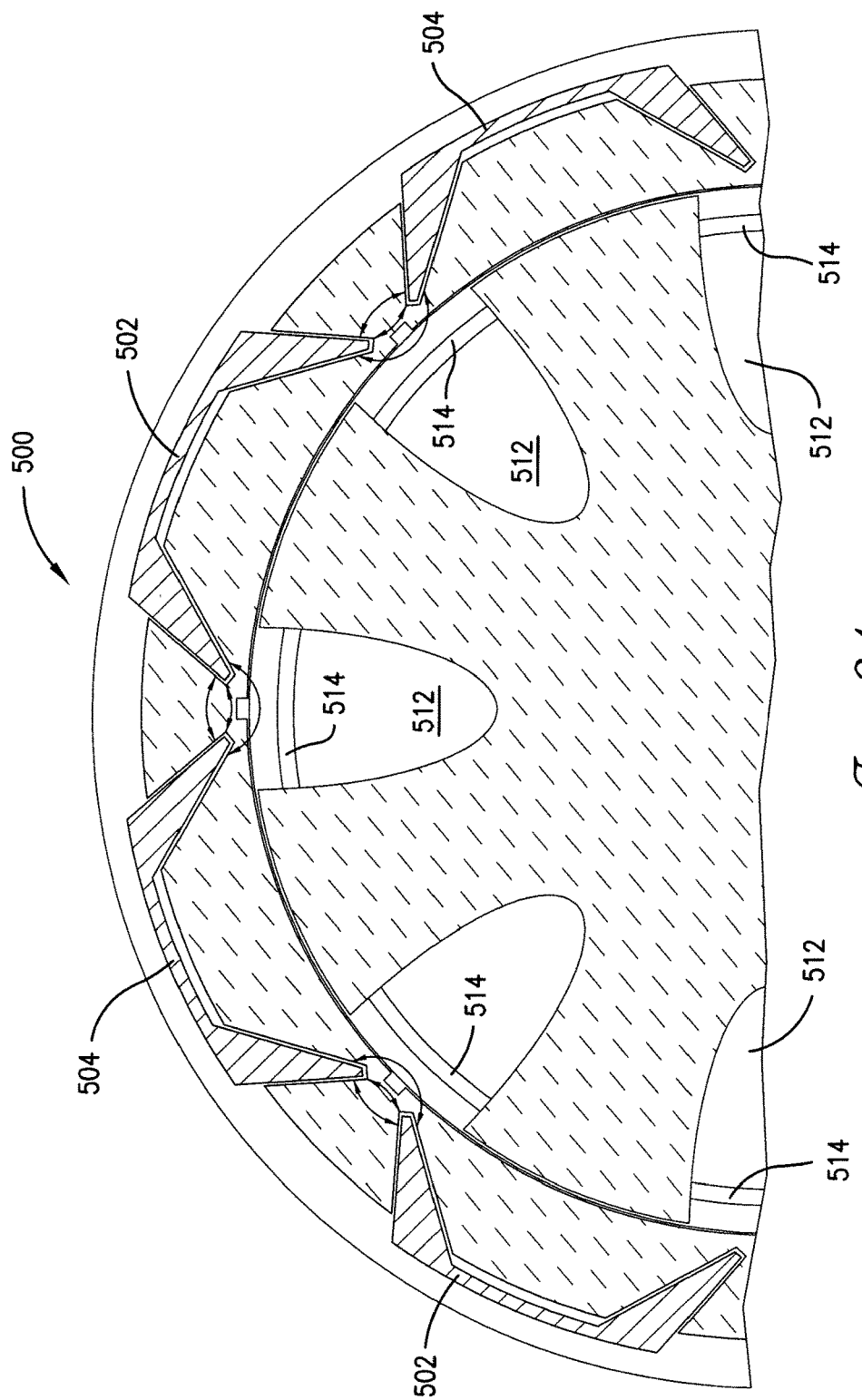
FIG. 21 is a front sectional view of the fourth alternative electric field generator cut along the line 21-21 from FIG. 17.

An electric field generator 400, shown in FIGS. 15-16, may include a pair of first electrodes 402, a second electrode 404, a first fluid path 406, and a second fluid path 408. The first electrodes 402 may each have a roughly conical annular shape and may be embedded in a cylindrical dielectric shell 410, spaced apart axially and oriented to mirror one another such that the electrodes extend toward one another. The second electrode 404 may include a first leg and a second leg electrically connected together with each leg having a roughly conical annular shape and extending away from one another. The second electrode 404 may be embedded in the dielectric shell 410 between the first electrodes 402. If each of the first electrodes 402 receives the same electronic signal or voltage, then the first electrodes 402 and the second electrode 404 may generate two axially-spaced electric fields 416 of the same magnitude, each having a roughly cylindrical shape, a portion of which may extend radially inward into the hollow interior of the dielectric shell 410. If each of the first electrodes 402 receives a different electronic signal or voltage, then the first electrodes 402 and the second electrode 404 may generate two axially-spaced electric fields 416 of different magnitudes, each having a roughly cylindrical shape, a portion of which may extend radially inward into the hollow interior of the dielectric shell 410.

The first fluid path 406 may be provided by a space between an inner surface of the dielectric shell 410 and an outer surface of a second fluid shell 412. The second fluid path 408 may be provided by a hollow interior of the second fluid shell 412. In addition, the second fluid shell 412 may include a beveled outer surface edge. The second fluid shell 412 may be positioned within the hollow interior of the dielectric shell 410 such that the beveled edge roughly aligns with the second electrode 404. A first fluid may flow along the first fluid path 406 until it encounters the first of the electric fields 416 which creates a plasma of the first fluid. The second fluid may flow along the second fluid path 408 until it reaches the beveled edge of the second fluid shell 412. As the plasma flows past the beveled edge, a portion of the plasma may be injected into the second fluid. The first fluid and/or the plasma may also flow through the second of the electric fields 416, further creating plasma and injecting the plasma into the second fluid to create an effluent.

An electric field generator 500, shown in FIGS. 17-21, may include a plurality of first electrodes 502, a plurality of second electrodes 504, a plurality of first fluid paths 506, and a plurality of second fluid paths 508. Each first electrode 502 may include a first leg and a second leg electrically connected together with each leg having a roughly conical annular shape and extending away from one another. Each second electrode 504 may be substantially similar to the first electrode 502. The first electrodes 502 and the second electrodes 504 may be embedded in a dielectric cylinder 510, at an outer surface thereof, axially-aligned, spaced apart, and distributed circumferentially such that each second electrode 504 is positioned between successive pairs of adjacent first electrodes 502. In addition, the first leg of one first electrode 502 faces the second leg of an adjacent second electrode 504, while the second leg of one first electrode 502 faces the first leg of an adjacent second electrode 504. A plurality of electric fields 516 may be generated, with each electric field 516 being formed between successive ones of adjacent first electrodes 502 and second electrodes 504. Each electric field 516 may have an elongated roughly rectangular shape, axially aligned and parallel to one another.

The dielectric cylinder 510 may include a plurality of axially-aligned chambers 512, spaced apart and uniformly distributed in the interior of the cylinder 510. Each chamber 512 may have a roughly U-shaped cross section with a curved outer surface. Each chamber 512 may be positioned radially inward from the first electrodes 502 and the second electrodes 504 such that a center of each chamber 512 is roughly aligned with the space between successive ones of adjacent first electrodes 502 and second electrodes 504. With this configuration, each electric field 516 may extend into one chamber 512.

Each first fluid path 506 may be provided by a space within each chamber 512 between the outer surface of the chamber 512 and an outer surface of a plate 514 that extends a width of the chamber 512 and a portion of a length of the chamber 512. Each second fluid path 508 may be provided a space within each chamber 512 between an inner surface of the plate 514 and an inner surface of the chamber 512. A first fluid may flow along each of the first fluid paths 506 and may flow through the electric field 516 for a distance until it encounters the end of each plate 514. As the first fluid flows through the electric field 516, plasma of the first fluid may be created. A second fluid may flow along each of the second fluid paths 508 until it encounters the end of each plate 514, at which point, at least a portion of the plasma may be injected into the second fluid, thereby creating an effluent.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A plasma reactor comprising:
a housing including two opposing end surfaces, an internal reactor chamber, and an axial aligned passageway extending from a first end surface through the reactor chamber to a second end surface;
a first fluid inlet configured to receive a first fluid and deliver the first fluid to the reactor chamber;
a second fluid inlet aligned with the passageway, the second fluid inlet configured to receive a second fluid and deliver the second fluid to the reactor chamber;
a first electric field generator positioned in the reactor chamber and including a first electrode and a spaced apart second electrode, the first electric field generator configured to generate a first electric field of roughly hollow cylindrical shape, wherein the first fluid passes through the first electric field creating a plasma which is injected into the second fluid while the second fluid is flowing through the passageway to create an effluent; and
an effluent outlet aligned with the passageway, the effluent outlet configured to receive the effluent from the reactor chamber and deliver it to a destination.

2. The plasma reactor of claim 1, further comprising a second electric field generator including a ring shaped first electrode positioned radially outward from the first electric field and an axially-elongated second electrode positioned in a path of the second fluid, the second electric field generator configured to generate a second electric field roughly annular in shape and oriented transverse to the first electric field through which the plasma and the second fluid flow.

3. The plasma reactor of claim 1, wherein the first electric field generator includes a dielectric shell which retains at least a portion of each of the first and second electrodes, and the second fluid inlet includes an inlet sleeve with a side wall, a portion of which is positioned within a portion of a hollow interior of the dielectric shell, such that there is a gap between an outer surface of the inlet sleeve and an inner surface of the dielectric shell, through which the first fluid flows before it passes through the first electric field.

4. The plasma reactor of claim 1, wherein the first and second electrodes each have a frusto-conical shell shape and the first and second electrodes are positioned in a dielectric shell such that the first electrode has an orientation that mirrors an orientation of the second electrode.

5. The plasma reactor of claim 4, wherein the first and second electrodes are positioned in the dielectric shell such that there is dielectric material between each electrode and an inner surface of the dielectric shell and at least a portion of the first electric field extends into a hollow interior of the dielectric shell and into a flow of the first fluid.

6. The plasma reactor of claim 4, wherein the dielectric shell includes a circumferential groove in an inner surface of the dielectric shell which creates a concentration in a strength of the first electric field and an eddy in a flow of the first fluid.

7. The plasma reactor of claim 1, wherein the first and second electrodes each have a general ring shape with a roughly planar inner surface, a roughly planar outer surface, a roughly planar first side surface, and a curved second side surface opposing the planar side surface and the first electrode is positioned in a first dielectric shell and the second electrode is positioned in a second dielectric shell such that the curved surface of the first electrode faces the curved surface of the second electrode.

8. The plasma reactor of claim 7, wherein the second dielectric shell includes a channel on a side surface, the second fluid inlet includes an inlet sleeve with a beveled edge, and the first electric field generator includes a dielectric shell with a sidewall that has an inner surface that is curved inward, such that the channel, the beveled edge, and the inner surface in combination form a path for the plasma to flow into the second fluid.

9. A plasma reactor comprising:
a housing including two opposing end surfaces, an internal reactor chamber, and an axial aligned passageway extending from a first end surface through the reactor chamber to a second end surface;
a first fluid inlet configured to receive a first fluid and deliver the first fluid to the reactor chamber;
a second fluid inlet aligned with the passageway, the second fluid inlet configured to receive a second fluid and deliver the second fluid to the reactor chamber;
a first electric field generator positioned in the reactor chamber and including a first electrode and a spaced apart second electrode, each electrode at least partially embedded in a dielectric shell, the first electric field generator configured to generate a first electric field of roughly hollow cylindrical shape, wherein the first fluid flows through the first electric field roughly in line with the first electric field creating a plasma which is injected into the second fluid to create an effluent; and
an effluent outlet aligned with the passageway, the effluent outlet configured to receive the effluent from the reactor chamber and deliver it to a destination.

10. The plasma reactor of claim 9, wherein the second fluid inlet includes an inlet sleeve with a side wall, a portion of which is positioned within a portion of a hollow interior of the dielectric shell, such that there is a gap between an outer surface of the inlet sleeve and an inner surface of the dielectric shell, through which the first fluid flows before it passes through the first electric field.

11. The plasma reactor of claim 9, wherein the first and second electrodes each have a frusto-conical shell shape and the first and second electrodes are positioned in the dielectric shell such that the first electrode has an orientation that mirrors an orientation of the second electrode.

12. The plasma reactor of claim 9, wherein the first and second electrodes are positioned in the dielectric shell such that there is dielectric material between each electrode and an inner surface of the dielectric shell and at least a portion of the first electric field extends into a hollow interior of the dielectric shell and into a flow of the first fluid.

13. The plasma reactor of claim 12, wherein the dielectric shell includes a circumferential groove in the inner surface of the dielectric shell which creates a concentration in a strength of the first electric field and an eddy in the flow of the first fluid.

14. The plasma reactor of claim 9, further comprising a second electric field generator including a ring shaped first electrode embedded in the dielectric shell and an axially-elongated second electrode positioned in the path of the second fluid, the second electric field generator configured to generate a second electric field roughly annular in shape and oriented transverse to the first electric field through which the plasma and the second fluid flow.

15. The plasma reactor of claim 14, wherein the second electric field guides the flow of positive ions from the plasma, guides the flow of electrons from the plasma, or both.

16. A plasma reactor comprising:
a housing including two opposing end surfaces, an internal reactor chamber, and an axial aligned passageway extending from a first end surface through the reactor chamber to a second end surface;
a first fluid inlet configured to receive a first fluid and deliver the first fluid to the reactor chamber;
a second fluid inlet aligned with the passageway, the second fluid inlet configured to receive a second fluid and deliver the second fluid to the reactor chamber;
a first electric field generator positioned in the reactor chamber and including a first electrode embedded in a first dielectric shell and a second electrode embedded in a second dielectric shell spaced apart from the first dielectric shell to create a gap therebetween, the first electric field generator configured to generate a first electric field of roughly hollow cylindrical shape, wherein the first fluid flows through the gap and roughly transversely through the first electric field creating a plasma which is injected into the second fluid while the second fluid is flowing through the passageway to create an effluent; and
an effluent outlet aligned with the passageway, the effluent outlet configured to receive the effluent from the reactor chamber and deliver it to a destination.

17. The plasma reactor of claim 16, wherein the first and second electrodes each have a general ring shape with a roughly planar inner surface, a roughly planar outer surface, a roughly planar first side surface, and a curved second side surface opposing the planar side surface and the first electrode is positioned in the first dielectric shell and the second electrode is positioned in the second dielectric shell such that the curved surface of the first electrode faces the curved surface of the second electrode.

18. The plasma reactor of claim 16, wherein the second dielectric shell includes a channel on a side surface, the second fluid inlet includes an inlet sleeve with a beveled edge, and the first electric field generator includes a dielectric shell with a sidewall that has an inner surface that is curved inward, such that the channel, the beveled edge, and the inner surface in combination form a path for the plasma to flow into the second fluid.

19. The plasma reactor of claim 16, further comprising a second electric field generator including a ring shaped first electrode positioned between the first dielectric shell and the second dielectric shell and an axially-elongated second electrode positioned in the path of the second fluid, the second electric field generator configured to generate a second electric field roughly annular in shape and oriented transverse to the first electric field through which the plasma and the second fluid flow.

20. The plasma reactor of claim 19, wherein the second electric field guides the flow of positive ions from the plasma, guides the flow of electrons from the plasma, or both.

* * * * *